(12) United States Patent
Takeuchi et al.

(10) Patent No.: US 8,972,087 B2
(45) Date of Patent: Mar. 3, 2015

(54) VEHICLE CONTROL SYSTEM

(75) Inventors: Keisuke Takeuchi, Susono (JP); Toshio Tanahashi, Susono (JP); Yoshimitsu Agata, Susono (JP); Ken Koibuchi, Hadano (JP); Kaiji Itabashi, Gotenba (JP); Shin Noumura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/704,858

(22) PCT Filed: Sep. 14, 2011

(86) PCT No.: PCT/IB2011/002128
§ 371 (c)(1),
(2), (4) Date: Dec. 17, 2012

(87) PCT Pub. No.: WO2012/035405
PCT Pub. Date: Mar. 22, 2012

(65) Prior Publication Data
US 2013/0166121 A1    Jun. 27, 2013

(30) Foreign Application Priority Data

Sep. 15, 2010   (JP) ................................. 2010-207210

(51) Int. Cl.
*B60W 10/10* (2012.01)
*B60W 10/06* (2006.01)
(Continued)

(52) U.S. Cl.
CPC .............. *B60K 6/445* (2013.01); *B60W 20/108* (2013.01); *B60W 10/10* (2013.01); *B60W 10/06* (2013.01); *B60W 10/08* (2013.01); *B60W 10/18* (2013.01); *B60W 10/20* (2013.01); *B60W 10/22* (2013.01);
(Continued)

(58) Field of Classification Search
USPC .................................................. 701/1, 22, 37
See application file for complete search history.

(56) References Cited

U.S. PATENT DOCUMENTS

| 6,637,530 B1 * | 10/2003 | Endo et al. ..................... 903/903 |
| 8,521,338 B2 * | 8/2013 | Takeuchi et al. ................. 701/37 |
| 2012/0136506 A1 | 5/2012 | Takeuchi et al. |

FOREIGN PATENT DOCUMENTS

| JP | A-63-028741 | 2/1988 |
| JP | A-06-072308 | 3/1994 |

(Continued)

OTHER PUBLICATIONS

Japanese Office Action issued in Application No. 2010-207210; Dated Nov. 8, 2012 (With Translation Only).

*Primary Examiner* — John Q Nguyen
*Assistant Examiner* — Anshul Sood
(74) *Attorney, Agent, or Firm* — Oliff PLC

(57) ABSTRACT

A vehicle control system includes: a controller that configured to obtain an index on the basis of a running condition of a vehicle and that configured to vary a running characteristic of the vehicle on the basis of the index, wherein the controller is configured to relatively delay a variation in the index in response to a variation in the running condition when the variation in the index decreases quickness of a behavior of the vehicle as compared with when the variation in the index increases the quickness of the behavior of the vehicle, and to correct the running characteristic on the basis of the index so that energy efficiency of a driving force source of the vehicle varies within a predetermined range depending on control over power output from the driving force source.

8 Claims, 10 Drawing Sheets

(51) Int. Cl.
*B60W 20/00* (2006.01)
*B60W 10/08* (2006.01)
*B60K 6/445* (2007.10)
*B60W 10/18* (2012.01)
*B60W 10/20* (2006.01)
*B60W 10/22* (2006.01)
*B60W 30/188* (2012.01)
*B60W 50/06* (2006.01)
*B60W 50/00* (2006.01)

(52) U.S. Cl.
CPC ......... *B60W 20/102* (2013.01); *B60W 30/1882* (2013.01); *B60W 50/06* (2013.01); *Y10S 903/93* (2013.01); *Y10S 903/945* (2013.01); *B60W 2050/0088* (2013.01); *B60W 2050/0095* (2013.01); *B60W 2510/244* (2013.01); *B60W 2520/105* (2013.01); *B60W 2520/125* (2013.01); *Y02T 10/56* (2013.01); *Y02T 10/6239* (2013.01); *Y02T 10/6286* (2013.01)

USPC .................. 701/22; 701/1; 701/37; 903/930; 903/945

(56) References Cited

FOREIGN PATENT DOCUMENTS

| | | |
|---|---|---|
| JP | A-06-249007 | 9/1994 |
| JP | A-10-077893 | 3/1998 |
| JP | A-10-324175 | 12/1998 |
| JP | A-2001-112115 | 4/2001 |
| JP | A-2007-269257 | 10/2007 |
| WO | WO 2011/021084 A2 | 2/2011 |
| WO | WO 2011/021088 A1 | 2/2011 |
| WO | WO 2011/021089 A2 | 2/2011 |
| WO | WO 2011/021090 A2 | 2/2011 |
| WO | WO 2011/021634 A1 | 2/2011 |

\* cited by examiner

VEHICLE CONTROL SYSTEM

BACKGROUND OF THE INVENTION

1. Field of the Invention

The invention relates to a control system that controls a running characteristic, such as a driving force characteristic and a chassis characteristic, on the basis of a predetermined index obtained on the basis of a running condition, such as the acceleration of a vehicle.

2. Description of Related Art

Driver's expectations and requests to a vehicle are various for each driving scene. Quick running (so-called sporty running) is desired in some driving scenes, and smooth relaxed running (so-called mild running) is desired in other driving scenes on the contrary. Thus, there are various scenes in which vehicles are running. In contrast to this, the running characteristic of each vehicle is predetermined in a design phase on the basis of the type of a vehicle, or the like, and may not completely agree to a driver's driving orientation (or a driver's driving taste).

In an existing art, there have been various attempts to reduce such disagreement between the running characteristic of a vehicle and the driving orientation of a driver as much as possible. For example, Japanese Patent Application Publication No. 06-249007 (JP-A-06-249007) describes a driving force control system that uses a neurocomputer. The driving force control system is configured to learn the correlation of an acceleration against an accelerator stroke and a vehicle speed as a required acceleration model and then compute a throttle opening degree on the basis of a deviation between the required acceleration model and a second reference acceleration model that incorporates a driving orientation and a deviation between the second reference acceleration model and a standard first reference acceleration model.

Vehicles are transportation equipment that consumes energy, such as gasoline, light oil and electricity, to run, so energy efficiency or a fuel efficiency characteristic is desirably excellent. Therefore, it is necessary to develop a technique for achieving both improvement in energy efficiency and improvement in running characteristic.

SUMMARY OF THE INVENTION

The invention provides a vehicle control system that is able to obtain a running characteristic adapted to a driver's driving orientation and that is able to improve energy efficiency (so-called fuel efficiency).

A first aspect of the invention provides a vehicle control system. The vehicle control system includes: a controller that configured to obtain an index on the basis of a running condition of a vehicle and that configured to vary a running characteristic of the vehicle on the basis of the index, wherein the controller is configured to relatively delay a variation in the index in response to a variation in the running condition when the variation in the index decreases quickness of a behavior of the vehicle as compared with when the variation in the index increases the quickness of the behavior of the vehicle, and to correct the running characteristic on the basis of the index so that energy efficiency of a driving force source of the vehicle varies within a predetermined range depending on control over power output from the driving force source.

With the above configuration, the control characteristic of the controller is changed to change the control characteristic of the driving force source, and the control characteristic of the controller is changed on the basis of the index obtained from the running condition of the vehicle, so the control characteristic suitable for a running condition of the vehicle or the control characteristic for running characteristic) suitable for a driver's driving orientation that appears as the running condition of the vehicle may be set. In addition, the control characteristic of the controller is set so that the energy efficiency of the driving force source falls within the predetermined range, so the running characteristic adapted to the driving orientation in consideration of the energy efficiency may be set.

The running condition may include a resultant acceleration that includes a longitudinal acceleration component and lateral acceleration component of the vehicle, the controller may be configured to set the index so as to be larger as the resultant acceleration increases, and the controller may be configured to set the running characteristic such that energy efficiency of the driving force source is better when the index is obtained on the basis of a resultant acceleration smaller than a predetermined value than when the index is obtained on the basis of a resultant acceleration larger than or equal to the predetermined value.

With the above configuration, the control characteristic of the controller based on the index obtained on the basis of a small acceleration is set so as to improve energy efficiency of the driving force source; whereas, when the index is obtained on the basis of a large acceleration, the control characteristic is set to improve output efficiency of the driving force source and to satisfy a required maximum acceleration rate. Thus, the running characteristic adapted to a driving orientation in consideration of energy efficiency may be set.

The vehicle may include an internal combustion engine as the driving force source, the controller may be configured to control a rotational speed of the internal combustion engine, and the energy efficiency of the driving force source may be fuel efficiency of the of the internal combustion engine.

With the above configuration, it is possible to set the running characteristic adapted to a driving orientation in consideration of energy efficiency in a vehicle equipped with a internal combustion engine as a driving force source.

The vehicle may further include a transmission of which a speed ratio is varied to vary the rotational speed of the internal combustion engine, and the controller may be configured to control the speed ratio of the transmission such that the rotational speed of the internal combustion engine becomes a rotational speed at which the fuel efficiency falls within the predetermined range.

With the above configuration, the control characteristic of the controller that controls the speed ratio that varies the rotational speed of the internal combustion engine is varied on the basis of the index, the rotational speed of the internal combustion engine may be controlled so that a fuel efficiency falls within a predetermined range and the characteristic based on the index is achieved. As a result, the running characteristic adapted to a driving orientation in consideration of energy efficiency may be set.

The vehicle may further include a power split mechanism that has a differential function for splitting power output from the internal combustion engine and a generator that is coupled to the power split mechanism and that is configured to vary a rotational speed of the internal combustion engine on the basis of an amount of electric power generated, and the controller may be configured to control a rotational speed of the generator such that the rotational speed of the internal combustion engine becomes a rotational speed at which the fuel efficiency falls within the predetermined range.

With the above configuration, in a hybrid vehicle that uses an internal combustion engine and a generator as a driving force source, the running characteristic adapted to a driving orientation in consideration of energy efficiency may be set.

The vehicle may further include an electrical storage device that stores electric power generated by the generator, and the rotational speed at which the fuel efficiency falls within the predetermined range may be lower when an amount of electric power stored in the electrical storage device is large than when the amount of electric power stored in the electrical storage device is small.

With the above configuration, the control characteristic of the controller is changed on the basis of the amount of electric power remaining in the electrical storage device of the hybrid vehicle, that is, the amount of electric power already stored in the electrical storage device, so it is possible to set the running characteristic adapted to a driving orientation in consideration of energy efficiency in the hybrid vehicle.

The acceleration may include a longitudinal acceleration component and lateral acceleration component of the vehicle.

With the above configuration, the driving force characteristic or the vehicle behavior characteristic is set on the basis of a resultant acceleration that further easily indicates a driver's driving orientation, so it is possible to set the running characteristic adapted to a driving orientation in consideration of energy efficiency.

The controller may acquire information about a running environment that is an environment outside the vehicle, including a road surface on which the vehicle runs, and may correct the running characteristic on the basis of the index and the information about the running environment.

With the above configuration, the running characteristic in consideration of a running environment may be set, so it is possible to set the running characteristic adapted to a driving orientation in consideration of energy efficiency.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
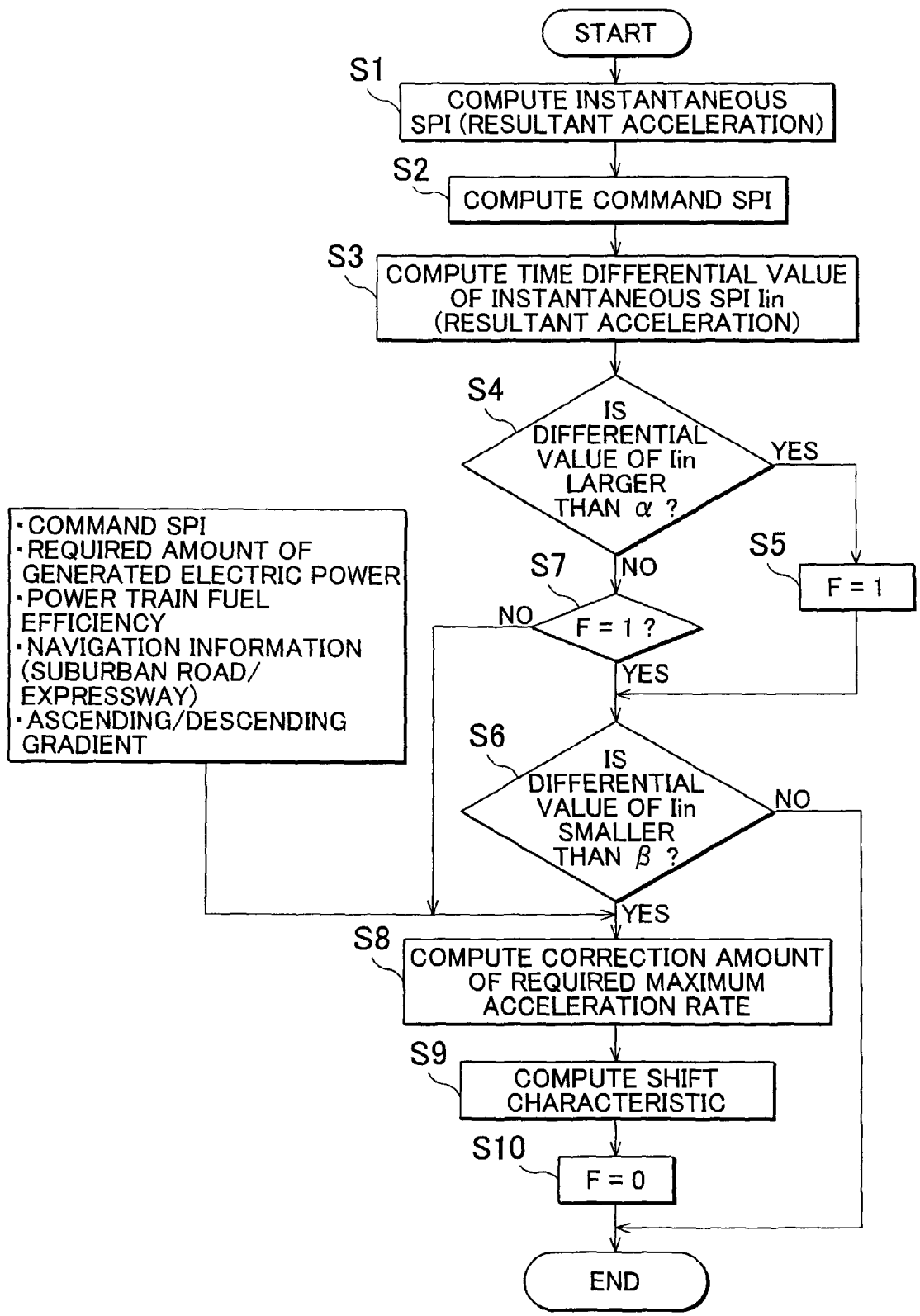
FIG. 1 is a flowchart for illustrating a further specific example of control executed by a control system according to an embodiment of the invention.

An embodiment of the invention will be described with reference to specific examples. A vehicle to which a control system according to the embodiment of the invention is applied is a general vehicle that is configured so that the vehicle transmits power, output from a driving force source, to drive wheels to run and steers front wheels using a steering mechanism to turn and, in addition, brakes are respectively arranged at the wheels and a vehicle body is supported by a suspension mechanism. The driving force source may be formed of an internal combustion engine (engine), may be formed of an engine and a generator (that is, a motor generator) or may be formed of a motor.

In a vehicle that uses an engine as a driving force source, a step-gear or continuously variable transmission may be coupled to the output side of the engine. Thus, in the vehicle having a configuration of this type, a mechanism that varies the throttle opening degree of the engine, a mechanism that varies a speed ratio or a device that directly controls these mechanisms functions as a so-called first controller. In addition, a so-called hybrid vehicle that includes an engine and a generator as a driving force source may be configured so that the engine and the generator are coupled to a power split mechanism having a differential function, such as a planetary gear mechanism, and the rotational speed of the internal combustion engine is controlled on the basis of the rotational speed of the generator. Thus, in a hybrid vehicle of this type, a mechanism that varies the throttle opening degree of the engine and a mechanism that varies the amount of electric power generated by the generator and the rotational speed of the generator, or a device that directly controls these mechanisms functions as a first controller. Furthermore, in a vehicle that uses a motor as a driving force source, a transmission may be coupled to the output side of the driving force source where necessary. Thus, in a so-called electric vehicle of this type, a mechanism that varies the current of a motor and a mechanism that varies the speed ratio, or a device that directly controls these mechanisms functions as a first controller.

In addition, the control system according to the embodiment of the invention is configured to vary details of control over steering made by a steering mechanism, details of control over braking made by brakes and details of control over support of a vehicle body by a suspension mechanism on the basis of the running condition of the vehicle together with control over a drive line, such as the engine and the transmission. These mechanisms operate so as to change the behavior of the vehicle, so the control system according to the embodiment of the invention is configured to change the behavior characteristic on the basis of the running condition of the vehicle. The running characteristic includes a driving force characteristic provided by the driving force source, the transmission and the brakes, a steering characteristic, turning characteristic and power assist characteristic provided by the steering mechanism, a suspension characteristic and damper characteristic provided by the suspension mechanism, and the like. In the following description, the "running characteristic" may collectively mean these characteristics. Then, an actuator or a controller that varies the behavior characteristic of the vehicle, such as a brake characteristic provided by the brakes, a steering characteristic, turning characteristic and power assist characteristic provided by the steering mechanism, a suspension characteristic and damper characteristic provided by the suspension mechanism, functions as a so-called second controller.

In addition, the control system according to the embodiment of the invention obtains an index (parameter) from a running condition. The running condition includes a longitudinal or lateral acceleration, a resultant acceleration that combines these longitudinal and lateral accelerations, an accelerator operation amount, a brake operation amount, the degree of yawing, a yaw rate, and the like. In addition, the acceleration includes an actual acceleration detected by a sensor and an estimated acceleration calculated from an accelerator operation amount or a brake operation amount. A specific example described below is an example that uses an index obtained from an acceleration.

Figure 2:
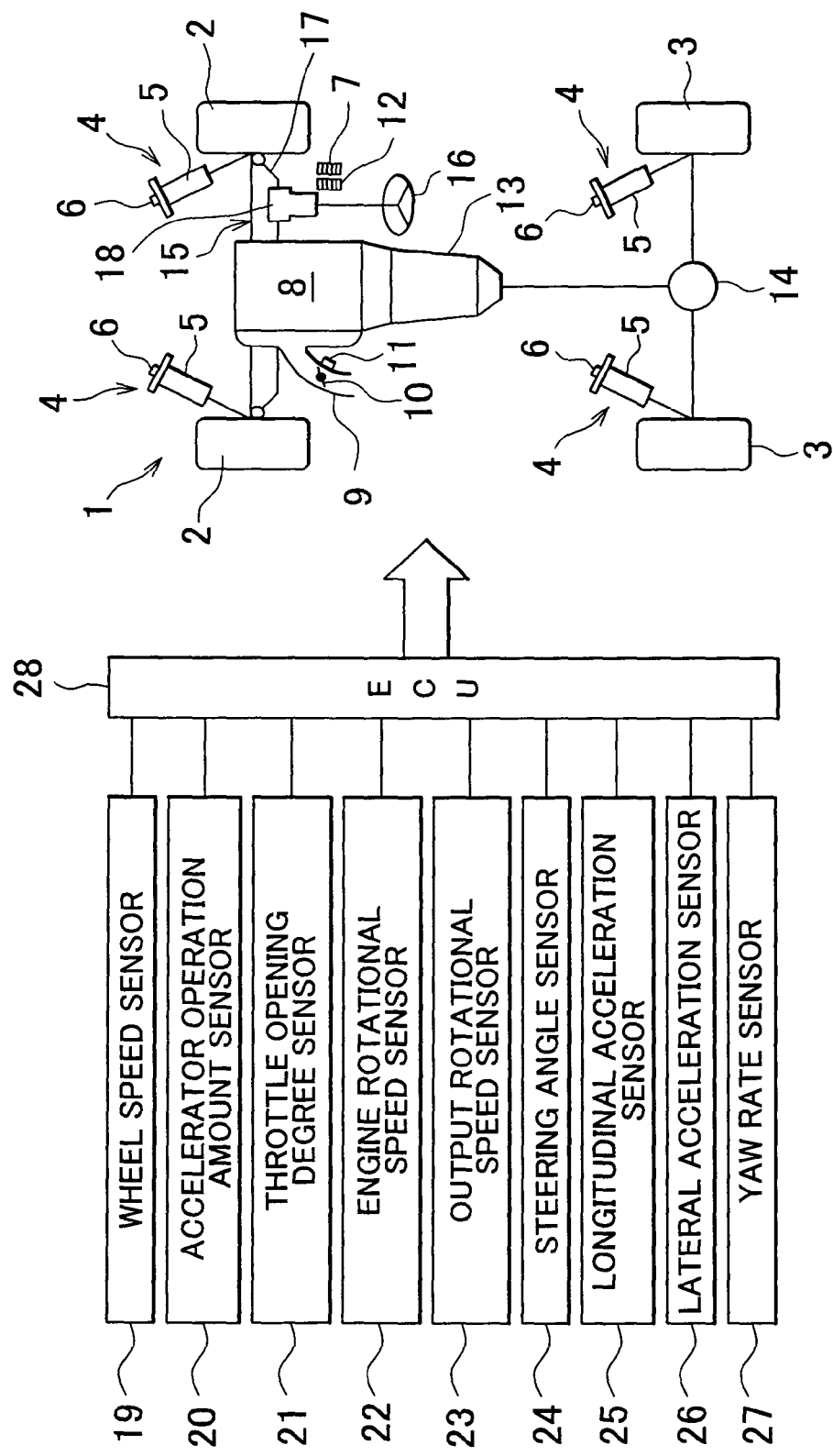
FIG. 2 is a view that schematically shows a vehicle to be controlled according to the embodiment of the invention.

First, an example of a vehicle to be controlled according to the embodiment of the invention will be described. In the embodiment of the invention, a vehicle subjected to control accelerates, decelerates or turns by driver's operation. A typical example of the vehicle is an automobile that uses an internal combustion engine or a motor as a driving force source. FIG. 2 is a block diagram that shows one example of the vehicle. The vehicle 1 is an automobile that includes four wheels consisting of two steered front wheels 2 and two driving rear wheels 3. Each of these four wheels 2 and 3 is assembled to a vehicle body (not shown) by a suspension device 4. Each suspension device 4, as well as a generally known suspension device, is principally formed of a spring and a shock absorber (damper). FIG. 2 shows the shock absorbers 5. Each shock absorber 5 causes cushioning action using the flow resistance of a fluid, such as gas and liquid, and is able to change the flow resistance by an actuator, such as a motor 6. When the flow resistance of each shock absorber 5 is increased, the vehicle body is hard to squat down and provides a so-called stiff characteristic, and the behavior of the vehicle becomes less comfortable and provides an increased sporty feel. Note that the vehicle 1 may be configured to adjust the vehicle height by supplying or drawing pressurized gas to or from these shock absorbers 5.

Brake devices (not shown) are provided for the respective front and rear wheels 2 and 3. The brake devices are operable to apply braking force to the respective front and rear wheels 2 and 3 when a brake pedal 7 arranged at a driver seat is depressed.

Figure 3:
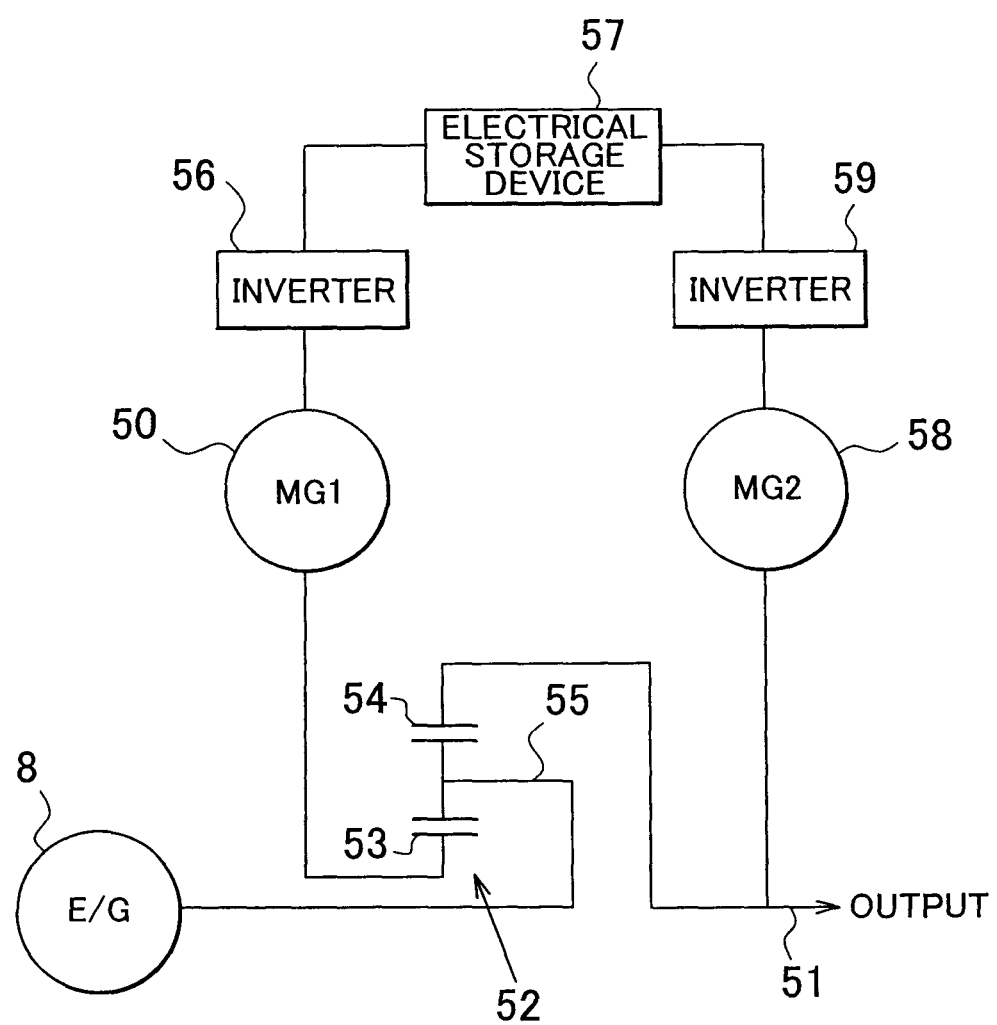
FIG. 3 is a diagram that schematically shows an example of a two-motor hybrid system.

The driving force source of the vehicle 1 is a generally known driving force source, such as an internal combustion engine, a motor and a combination of them. FIG. 3 shows an example of the vehicle 1 equipped with an internal combustion engine (engine) 8. A throttle valve 10 for controlling an intake air flow rate is arranged in an intake pipe 9 of the engine 8. The throttle valve 10 is an electronic throttle valve. The throttle valve 10 is, for example, opened or closed by an electrically controlled actuator 11, such as a motor, to thereby adjust the opening degree. Then, the actuator 11 operates in accordance with a depression amount of an accelerator pedal 12 arranged at the driver seat, that is, an accelerator operation amount, to thereby adjust the throttle valve 10 to a predetermined opening degree (throttle opening degree).

The correlation between an accelerator operation amount and a throttle opening degree may be appropriately set. As the correlation between an accelerator operation amount and a throttle opening degree approaches a one-to-one correlation, the driver more strongly experiences a so-called direct feel and, therefore, the running characteristic of the vehicle becomes a sporty characteristic. In contrast, when the characteristic is set so that the throttle opening degree becomes relatively low against the accelerator operation amount, the running characteristic of the vehicle becomes a so-called mild characteristic. When the motor is used as a driving force source, a current controller, such as an inverter and a converter, is provided instead of the throttle valve 10. Then, the current controller is configured to adjust supplied current in accordance with an accelerator operation amount and to appropriately change the correlation of a current value with respect to an accelerator operation amount, that is, the running characteristic.

A transmission 13 is coupled to an output side of the engine 8. The transmission 13 is configured to appropriately change the ratio between an input rotational speed and an output rotational speed, that is, a speed ratio. The transmission 13 is, for example, a generally known transmission, such as a step-gear automatic transmission, a belt-type continuously variable transmission and a toroidal-type continuously variable transmission. The transmission 13 includes an actuator (not shown). The transmission 13 is configured to change the speed ratio in a stepwise manner or continuously by appropriately controlling the actuator. Specifically, a shift map that defines a speed ratio in correspondence with a state of the vehicle, such as a vehicle speed and an accelerator operation amount, is prepared in advance, and shift control is executed in accordance with the shift map. Alternatively, a target output is calculated on the basis of a state of the vehicle, such as a vehicle speed and an accelerator operation amount, a target engine rotational speed is obtained on the basis of the target output and an optimal fuel efficiency line, and then shift control is executed so as to attain the target engine rotational speed.

The transmission 13 is configured so as to be able to select energy efficiency control that places importance on fuel efficiency or energy efficiency control that increases driving force over the above described basic shift control. The energy efficiency control for placing importance on fuel efficiency is control for upshifting at a relatively low vehicle speed or control for using a relatively high-speed-side speed ratio (low speed ratio) at a low vehicle speed. In addition, energy efficiency control for increasing driving force or increasing accelerating characteristic is control for upshifting at a relatively high vehicle speed or control for using a relatively low-speed-side speed ratio (high speed ratio) at a high vehicle speed. These controls may be executed, for example, in such a manner that a shift map is changed, a drive request amount is corrected or a calculated speed ratio is corrected. Note that a transmission mechanism, such as a torque converter equipped with a lock-up clutch, may be provided between the engine 8 and the transmission 13 where necessary. Then, an output shaft of the transmission 13 is coupled to the rear wheels (driving wheels) 3 via a differential gear 14 that is a final reduction gear.

A steering mechanism 15 that steers the front wheels 2 will be described. The vehicle 1 includes a steering linkage 17 and an assist mechanism 18. The steering linkage 17 transmits the rotating motion of a steering wheel 16 to the right and left front wheels 2. The assist mechanism 18 assists the steering angle or steering force of the steering wheel 16. The assist mechanism 18 includes an actuator (not shown), and is able to adjust an assist amount assisted by the actuator. As the assist amount is reduced, the correlation between a steering force (or steering angle) and an actual turning force (or turning angle) of the front wheels 2 approaches a one-to-one correlation, and the driver experiences a so-called increased direct feel in steering, and the running characteristic of the vehicle becomes a so-called sporty characteristic.

Note that, although not specifically shown in the drawing, the vehicle 1 is equipped with an anti-lock brake system (ABS), a traction control system, a vehicle stability control system (VSC), and the like, for stabilizing the behavior or attitude. The vehicle stability control system (VSC) comprehensively controls these systems. These systems are generally known. These systems are configured to decrease braking force exerted on the wheels 2 and 3 or exert braking force on the wheels 2 and 3 on the basis of a deviation between a vehicle body speed and a wheel speed and, additionally, control; engine torque at the same time, thus preventing or suppressing a lock or slip of the wheels 2 and 3 to stabilize the behavior of the vehicle. In addition, the vehicle may be provided with a navigation system that is able to obtain data in connection with a running road or a planned running road (that is, running environment) and/or a switch for manually selecting a running mode, such as a sporty mode, a normal mode and a low fuel consumption (good fuel efficiency) mode (eco mode). Furthermore, the vehicle may include a four wheel drive mechanism (4WD) that is able to change the running characteristic, such as hill-climbing characteristic, accelerating characteristic and a turning characteristic.

The vehicle 1 includes various sensors that acquire data for controlling the engine 8, the transmission 13, the shock absorbers 5 of the suspension devices 4, the assist mechanism 18, the above described systems (not shown), and the like. The sensors are, for example, a wheel speed sensor 19, an accelerator operation amount sensor 20, a throttle opening degree sensor 21, an engine rotational speed sensor 22, an output rotational speed sensor 23, a steering angle sensor 24, a longitudinal acceleration sensor 25, a lateral acceleration sensor 26, a yaw rate sensor 27, and the like. The wheel speed sensor 19 detects the rotational speed of each of the front and rear wheels 2 and 3. The output rotational speed sensor 23 detects the output rotational speed of the transmission 13. The longitudinal acceleration sensor 25 detects a longitudinal acceleration (Gx). The lateral acceleration sensor 26 detects the acceleration in the lateral direction (transverse direction) (lateral acceleration Gy). Note that the acceleration sensors 25 and 26 may be shared with an acceleration sensor used in vehicle behavior control, such as the above anti-lock brake system (ABS) and vehicle stability control system (VSC), and, in the vehicle equipped with an airbag, the acceleration sensors 25 and 26 may be shared with an acceleration sensor provided for controlling deployment of the airbag. Furthermore, the longitudinal and lateral accelerations Gx and Gy may be obtained in such a manner that a value detected by an acceleration sensor inclined at a predetermined angle (for example, 45°) with respect to the longitudinal direction of the vehicle along a horizontal plane is decomposed into a longitudinal acceleration and a lateral acceleration. Furthermore, instead of detecting the longitudinal and lateral accelerations Gx and Gy by a sensor, the longitudinal and lateral accelerations Gx and Gy may be computed on the basis of an accelerator operation amount, a vehicle speed, a road load, a steering angle, and the like. These sensors 19 to 27 are configured to transmit detected signals (data) to an electronic control unit (ECU) 28. The electronic control unit 28 is configured to compute in accordance with those pieces of data and pre-stored data and programs and then output the computed results to the above described systems or the actuators of those systems as control command signals. Note that it is not limited to use the resultant acceleration; it may be an acceleration in any one direction, such as only in the vehicle longitudinal direction, may be used.

Here, an example of a driving force source in a hybrid vehicle will be described. FIG. 3 schematically shows a so-called two-motor hybrid system. The hybrid system is configured to distribute the power of the engine 8 to a first motor generator (MG1) 50 and an output shaft 51. A planetary gear mechanism having a differential function is provided as a power split mechanism 52 for splitting the power of the engine 8. In the example shown in FIG. 3, a single-pinion-type planetary gear mechanism is employed. In the single-pinion-type planetary gear mechanism, pinion gears arranged between a sun gear 53 and a ring gear 54 are rotatably and revolvably held by a carrier 55. The engine 8 is coupled to the carrier 55, the first motor generator 50 is coupled to the sun gear 53, and the output shaft 51 is coupled, to the ring gear 54. The first motor generator 50 is an electric motor having a power generating function. The rotational speed of the engine 8 varies with the rotational speed of the first motor generator 50 by the differential function of the power split mechanism 52. Thus, the first motor generator 50 is able to control the rotational speed of the engine.

The first motor generator 50 is coupled to an electrical storage device 57 via an inverter 56. That is, the inverter 56 is used to control the amount of electric power generated by the first motor generator 50 or the torque or rotational speed of the first motor generator 50 in the case where the first motor generator 50 functions as an electric motor. Furthermore, a second motor generator 58 is coupled to the output shaft 51, and the second motor generator 58 is connected to the electrical storage device 57 via another inverter 59. Then, the hybrid system is configured to be able to mutually supply electric power between the motor generators 50 and 58. That is, when the first motor generator 50 functions as a generator, the hybrid system supplies the generated electric power to the second motor generator 58 to cause the second motor generator 58 to function as an electric motor, and once converts part of the power output from the engine 8 to electric power and then transmits the power to the output shaft 51.

The control system according to the embodiment of the invention is configured to incorporate the running condition of the vehicle into control over the behavior of the vehicle (that is control over the running characteristic). Here, the running condition of the vehicle is expressed by a longitudinal acceleration, a lateral acceleration, a yawing acceleration, a rolling acceleration or a resultant acceleration of some of these accelerations in the multiple directions. That is, when the vehicle is caused to run at a target speed or run in a target direction, or when the behavior of the vehicle, influenced by a running environment such as a road surface, is returned to an original state, accelerations in multiple directions usually occur. In consideration of this situation, a running environment or a driving orientation is conceivably incorporated in the running condition of the vehicle to some extent. On the basis of the above background, the control system according to the embodiment of the invention is configured to incorporate the running condition of the vehicle into control over the running characteristic of the vehicle.

As described above, the behavior of the vehicle includes an accelerating characteristic, a turning characteristic, a support stiffness of the suspension devices 4 (that is, the degree of bump/rebound and the tendency, of occurrence of bump/rebound), the degree of rolling, the degree of pitching, and the like. The control system according to the embodiment of the invention changes these running condition on the basis of the above running condition. The running characteristic may be changed by using an acceleration in any one of the directions or a resultant acceleration, which is, an example of the above running condition; however, in order to further reduce a sense of strangeness, an index obtained by correcting values that indicate the running condition may be used.

As an example of the index, a sportiness index (SPI) will be described. Here, the sportiness index is an index that indicates a driver's intention or a running condition of a vehicle. The sportiness index in this embodiment is an index obtained by combining accelerations in multiple directions (particularly, absolute values thereof). The sportiness index is, for example, an acceleration that combines the longitudinal acceleration Gx and the lateral acceleration Gy as an acceleration significantly associated with the behavior in the running direction. For example, an instantaneous sportiness index (instantaneous SPI) Iin is calculated by the mathematical expression (1). Here, the acceleration is not limited to an acceleration detected by a sensor; it may be computed or estimated on the basis of a driver's operation, such as an accelerator operation amount, a steering angle, a brake depression force and a depression amount of the brake pedal. In addition, the "instantaneous sportiness index Iin" means an index that is calculated on the basis of accelerations in the respective directions at an interval of each moment during running of the vehicle, and is a so-called physical quantity. Note that the "interval of each moment" means each time of repetition when detection of accelerations and calculation of an instantaneous sportiness index Iin based on the detected accelerations are repeatedly executed at a predetermined cycle time.

$$Iin=(Gx^2+Gy^2)^{1/2} \quad (1)$$

In addition, within the longitudinal acceleration Gx used in the above mathematical expression (1), at least one of an accelerating acceleration (a positive acceleration) and a decelerating (breaking) acceleration (a negative acceleration, that is, deceleration) is desirably normalized or weighted and then used. That is, in a general vehicle, the decelerating acceleration is larger than the accelerating acceleration; however, the difference is almost not experienced or recognized by the driver. In most cases, the driver recognizes that the accelerating and decelerating accelerations are almost equivalent to each other. Normalization is a process of correcting such a difference between an actual value and a feel experienced by the driver, and is a process of increasing the accelerating acceleration or decreasing the decelerating acceleration (that is, the deceleration) for the longitudinal acceleration Gx. More specifically, normalization is a process of obtaining the ratio between the maximum values of the respective accelerations and then multiplying the ratio by the accelerating or decelerating acceleration. Weighting is a process of correcting the decelerating acceleration for the lateral acceleration. In short, as in the case where longitudinal driving force and lateral force that can be generated in tires are represented by a tire friction circle, weighting is a correction process of, for example, weighting at least one of forward and rearward accelerations so that the maximum accelerations in the respective directions are placed on a circle of a predetermined radius. Through normalization and weighting, the degree of incorporation of the accelerating acceleration into the running characteristic is different from the degree of incorporation of the decelerating acceleration into the running characteristic. As one example of weighting, the decelerating acceleration and the accelerating acceleration are weighted so that, between the decelerating acceleration in the longitudinal direction of the vehicle and the accelerating acceleration in the longitudinal direction of the vehicle, the degree of influence of the accelerating acceleration is relatively larger than the degree of influence of the decelerating acceleration. Note that the lateral acceleration may be larger than the accelerating acceleration, so the lateral acceleration may also be subjected to normalization.

In this way, an actual acceleration and a feel experienced by the driver are different from each other depending on the direction of the acceleration. For example, there is conceivably such a difference between an actual acceleration and a feel experienced by the driver in an acceleration in the yawing direction, an acceleration in the rolling direction and a longitudinal acceleration. Then, in the embodiment of the invention, the control system is able to vary the degree of incorporation of each of accelerations in different directions into the running characteristic. In other words, the control system is able to vary the degree of a change in running characteristic based on an acceleration in any one of the directions from the degree of a change in running characteristic based on an acceleration in another direction.

Figure 4:
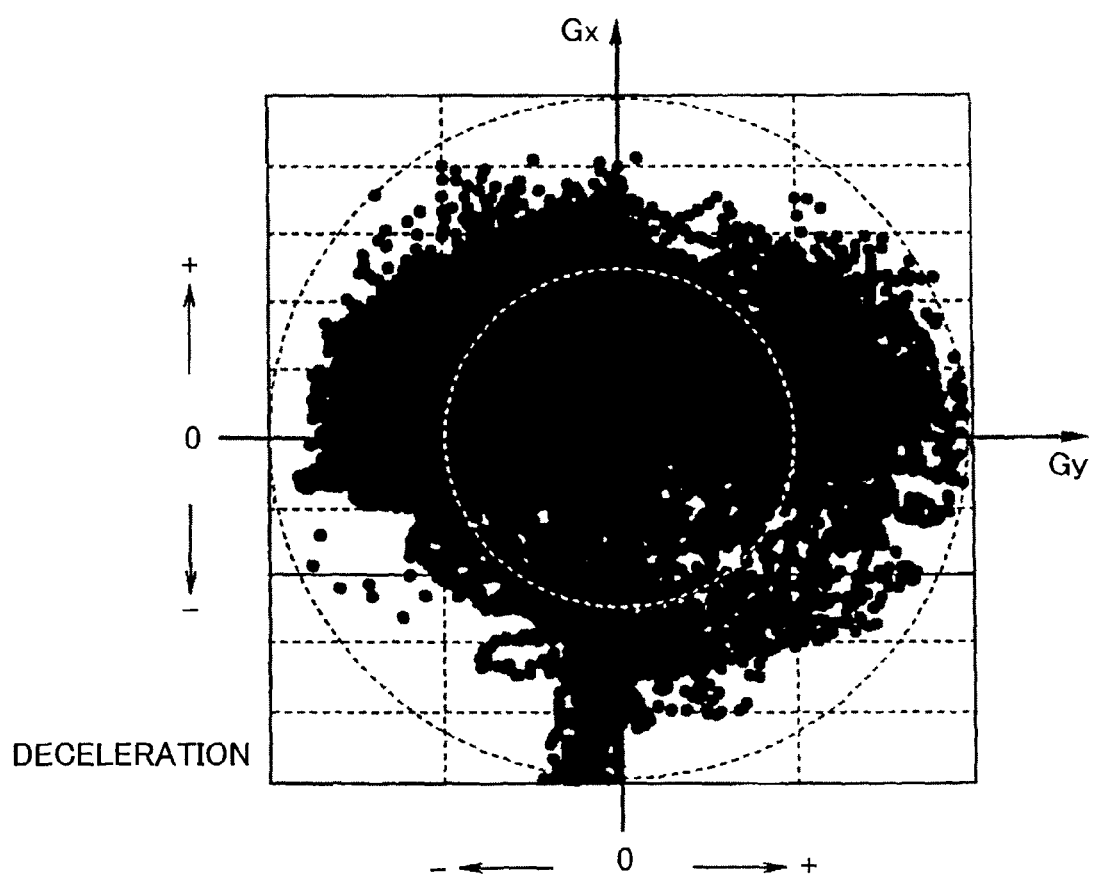
FIG. 4 is a graph that shows detected longitudinal accelerations and detected lateral accelerations that are plotted on a tire friction circle.

FIG. 4 shows an example of a tire friction circle on which the lateral accelerations Gy detected by the sensor and the normalized longitudinal accelerations Gx are plotted. This is an example when a vehicle runs on a test course that simulates an ordinary road. It appears that the frequency of an increase in lateral acceleration Gy is high when the vehicle significantly decelerates; however, both the longitudinal acceleration Gx and the lateral acceleration Gy generally tend to occur along the tire friction circle.

Figure 5:
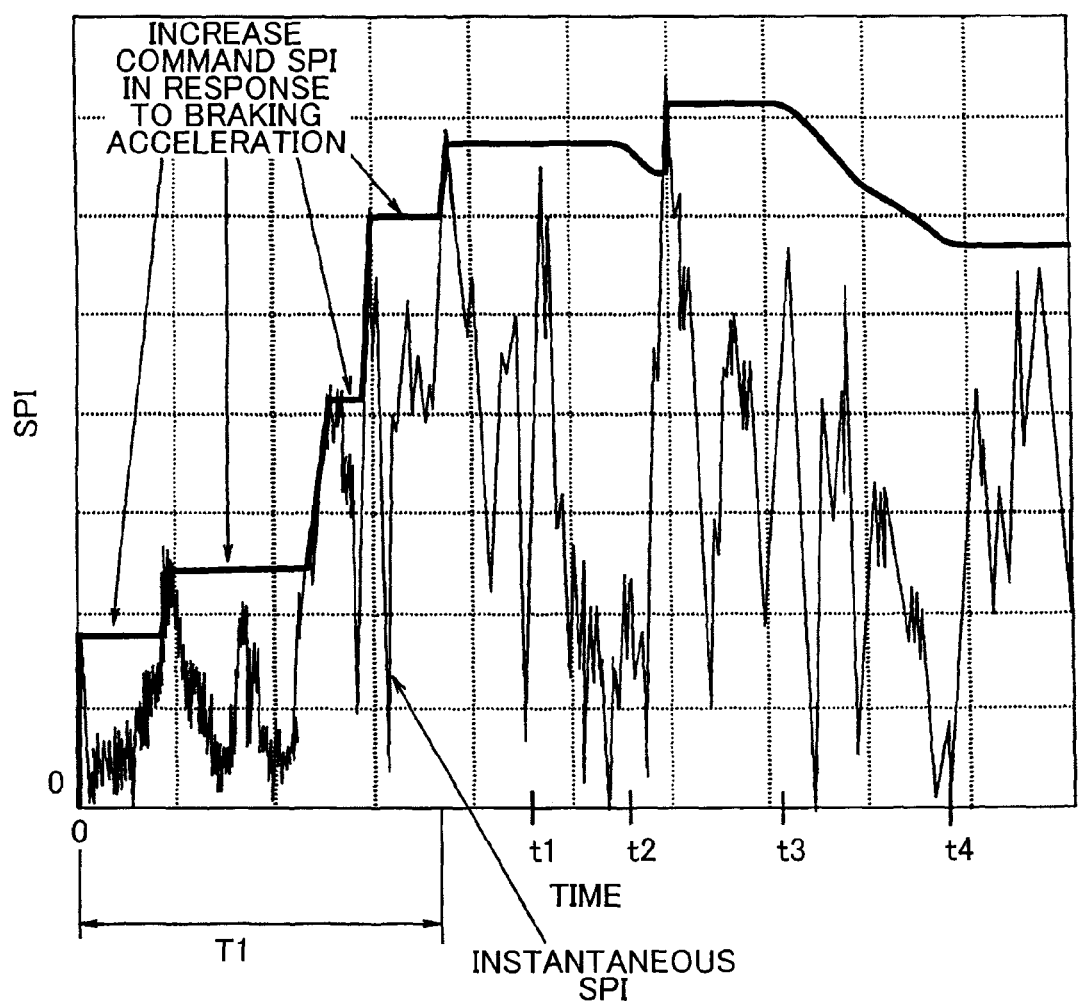
FIG. 5 is a view that shows an example of a variation in command SPI obtained on the basis of a variation in instantaneous SPI.

In the embodiment of the invention, a command sportiness index (command SPI) Iout is obtained from the above described instantaneous sportiness index. Iin. The command sportiness index Iout is an index used in control for changing the running characteristic, and is configured to immediately increase with an increase in instantaneous sportiness index Iin that is a base for calculating the command sportiness index Iout and to contrarily decrease with a delay from a decrease in instantaneous sportiness index Iin. Particularly, the command sportiness index Iout is configured to decrease when a predetermined condition is satisfied. FIG. 5 shows a variation in command sportiness index Iout obtained on the basis of a variation in instantaneous sportiness index Iin. In the example shown here, the instantaneous sportiness index fin is indicated by values plotted in FIG. 4. On the other hand, the command sportiness index Iout is set at a local maximum value of the instantaneous sportiness index Iin and is kept at the last value until a predetermined condition is satisfied. That is, the command sportiness index Iout is an index that quickly increases and relatively slowly decreases.

More specifically, for example, during a period T1 after a start of control in FIG. 5, when the vehicle brakes or turns, the instantaneous sportiness index Iin obtained by the variation in the acceleration increases or decreases; however, the instantaneous sportiness index Iin that is larger than the last local maximum value occurs before the above described predetermined condition is satisfied, so the command sportiness index Iout increases in a stepwise manner. In contrast, at t2 or t3, for example, when the vehicle shifts from acceleration during turning to acceleration during running straight ahead, the command sportiness index Iout decreases because a condition for decreasing the command sportiness index Iout is satisfied. In this way, in short, the condition for decreasing the command sportiness index Iout is satisfied if the command sportiness index Iout held at the last large value does not meet a driver's intention. In the embodiment of the invention, it is determined that the condition for decreasing the command sportiness index Iout is satisfied on the basis of a lapse of time.

That is, the situation that the command sportiness index Iout held at the last large value does not meet a driver's intention is that a deviation between the held command sportiness index Iout and the instantaneous sportiness index Iin generated during then is relatively large and this situation is continuing. Thus, the command sportiness index Iout is not decreased by the instantaneous sportiness index Iin caused by an operation that the driver temporarily returns the accelerator pedal 12 in the case where turning acceleration control is executed, or the like. On the other hand, the condition for decreasing the command sportiness index Iout is satisfied when it has been a predetermined period of time since the instantaneous sportiness index Iin, caused by an operation that the driver continuously returns the accelerator pedal 12 in the case where the vehicle gently decelerates, or the like, is lower than the command sportiness index Iout. In this way, the condition for decreasing the command sportiness index Iout may be a duration during which the instantaneous sportiness index Iin is lower than the command sportiness index Iout. In addition, in order to accurately incorporate an actual running condition into the command sportiness index Iout, it is applicable that the condition for decreasing the command sportiness index Iout is satisfied when a time integral value (or an accumulated value) of a deviation between the held command sportiness index Iout and the instantaneous sportiness index Iin reaches a predetermined threshold. Note that the threshold may be appropriately set by a driving test or simulation conducted in line with a driver's intention. When the latter time integral value of the deviation is used, the command sportiness index Iout is decreased in consideration of a period of time and a deviation between the command sportiness index Iout and the instantaneous sportiness index Iin, so control for changing the running characteristic into which an actual running condition or a behavior is further adequately incorporated is possible.

Note that, in the example shown in FIG. 5, a period of time during which the command sportiness index Iout is held up to t2 is longer than a period of time during which the command sportiness index Iout is held up to t3; however, this is because the following control is configured to be performed. That is, the command sportiness index Iout is increased and held at the last stage of the above described period T1 and, after that, the instantaneous sportiness index Iin increases at t1 before the above described condition for decreasing the command sportiness index Iout is satisfied, and then a deviation between the held command sportiness index Iout and the instantaneous sportiness index Iin is lower than or equal to a predetermined value. Note that the predetermined value may be appropriately set by a driving test or simulation conducted in line with a driver's intention or in consideration of a calculation error of the instantaneous sportiness index Iin. In this way, the fact that the instantaneous sportiness index Iin is close to the held command sportiness index Iout means that the running condition at that time is placed in the accelerating/decelerating condition and/or turning condition that causes the instantaneous sportiness index En based on which the held command sportiness index Iout is determined or in a condition close to that. That is, even when a certain period of time has elapsed after the time at which the command sportiness index Iout is increased to the held value, the running condition is approximate to the running condition at the time before a lapse of the period of time. Therefore, even when the instantaneous sportiness index Iin is lower than the command sportiness index Iout, the duration for satisfying the above described condition for decreasing the command sportiness index tout is extended so as to hold the last command sportiness index Iout. Control or process for extending the duration may be performed in such a manner that the above described integral value (accumulated value) of an elapsed time or integral value of the deviation is reset and then accumulation of an elapsed time or integration of the deviation is resumed, the accumulated value or integral value is reduced by a predetermined amount, or accumulation or integration is interrupted for a constant period of time, or the like.

Figure 6:
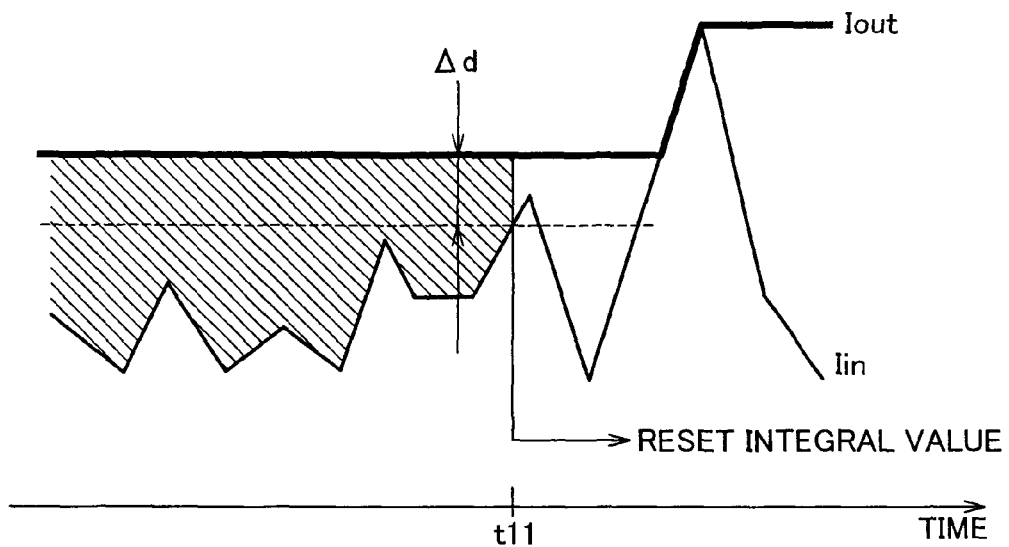
FIG. 6 is a view for illustrating the time integral of a deviation between the instantaneous SPI and the command SPI and a situation in which the integral value is reset.

FIG. 6 is a schematic time chart of illustrating the above described integration of the deviation and the reset of the integral value. The hatched area in FIG. 6 corresponds to the integral value of the deviation. The integral value is reset at t11 at which a deviation between the instantaneous sportiness index Iin and the command sportiness index Iout is smaller than or equal to a predetermined value Δd and then integration of the deviation is started again. Thus, the condition for decreasing the command sportiness index Iout is not satisfied, so the command sportiness index Iout is kept at the last value. Then, after resuming integration, as the instantaneous sportiness index Iin becomes larger than the held command sportiness index Iout, the command sportiness index Iout is updated to the large value corresponding to the instantaneous sportiness index Iin, the updated command sportiness index Iout is held, and then the integral value is reset.

Incidentally, the control system according to the embodiment of the invention is configured to obtain an index on the basis of the acceleration and to set the running characteristic on the basis of the index. The acceleration may be a so-called actual acceleration obtained by a sensor; instead, the acceleration may be an estimated acceleration (or target acceleration) computed from a required driving amount, a vehicle speed, a braking operation amount, a steering angle, or the like. In addition, both an actual acceleration and a target acceleration may be used. When both an actual acceleration and a target acceleration are used, indices (a first index and a second index) are obtained in correspondence with the respective accelerations, those indices are compared with each other and then the index having a higher sportiness index may be employed. For example, a so-called actual instantaneous sportiness index Iin is obtained on the basis of an actual acceleration and an actual command sportiness index Iout is obtained on the basis of the actual instantaneous sportiness index Iin; whereas a so-called target instantaneous sportiness index Iin is obtained on the basis of a target acceleration and a target command sportiness index Iout is obtained on the basis of the target instantaneous sportiness index Iin. Then, the larger one of these actual command sportiness index Iout and target command sportiness index Iout is employed, and the running characteristic may set on the basis of the employed command sportiness index Iout.

The above described command sportiness index Iout is determined from the instantaneous sportiness index Iin calculated on the basis of the actual acceleration or the estimated acceleration. As described above, the command sportiness index Iout indicates the running condition of the vehicle, and includes information about a running environment, such as a road surface gradient, the presence or absence of a corner and the curvature of the corner, and a driver's driving orientation. This is because the acceleration of the vehicle varies depending on the condition of a running road and an accelerating/decelerating operation is conducted by the driver on the basis of the condition of the running road and then the acceleration varies in accordance with the accelerating/decelerating operation. The control system according to the embodiment of the invention is configured to utilize the command sportiness index Iout for control over the running characteristic of the vehicle. In addition, the running characteristic in the embodiment of the invention includes a accelerating characteristic, a steering characteristic, a suspension characteristic, a sound characteristic, and the like. These characteristics may be appropriately set in such a manner that the above described control characteristic of the throttle valve 10, the shift characteristic of the transmission 13, the damping characteristic of the shock absorber 5 of each suspension device 4, the assist characteristic of the assist mechanism 18, and the like, are changed by the associated actuators. Generally, the finning characteristic is such that, as the command sportiness index Iout increases, the vehicle is able to achieve so-called more sporty running.

The command sportiness index Iout in the specific example described here is an index that combines a longitudinal acceleration Gx and a lateral acceleration Gy. The command sportiness index Iout is increased as the resultant acceleration, that is, the instantaneous sportiness index Iin, increases. Thus, the running characteristic based on the command sportiness index Iout is basically able to achieve more sporty running as the command sportiness index Iout increases. The control system according to the embodiment of the invention is configured to match the running characteristic with a driver's driving orientation and to set the running characteristic so as to improve the energy efficiency of the vehicle, that is, so as not to impair energy efficiency. An example of the above configuration is shown by the simplified flowchart of FIG. 1. The routine shown in FIG. 1 is configured to be executed by the ECU 28 when a mode in which the vehicle runs with the running characteristic set on the basis of the above described command sportiness index Iout is selected by a driver or a mode selection switch is operated to select the mode. First, an index that indicates the running condition at that point in time is computed (step S1). The index is, for example, the above described instantaneous sportiness index Iin (or resultant acceleration, that is, resultant G). The index incorporates a driver's driving orientation, a road gradient, a road environment such as a curve, and the like, at that point in time. Then, a command sportiness index Iout that is data utilized when the running characteristic is changed is computed (step S2). Note that a method of computing these instantaneous sportiness index Iin and command sportiness index Iout is as described above.

Furthermore, the time differential value of the acceleration (that is, jerk) is computed (step S3). In the example described here, a resultant acceleration of the longitudinal acceleration Gx and the lateral acceleration Gy is used as data that indicate the running condition of the vehicle, so the time differential value of the resultant acceleration is employed as a jerk. The jerk J is expressed by the following mathematical expression (2). It is determined whether the thus computed jerk (that is, the time differential value of the instantaneous sportiness index (resultant acceleration) Iin) is larger than a predetermined prohibiting determination threshold $\alpha$ (step S4). The prohibiting determination threshold $\alpha$ is a lower limit jerk at which it is not desirable that a variation in acceleration is superimposed on a variation in behavior caused by a change of the running characteristic, and is predetermined by a running test, a simulation, or the like. Then, one prohibiting determination threshold a may be set for the overall running characteristic. Different from this configuration, the prohibiting determination threshold a may be set one by one for the driving force characteristic, the shift characteristic, the steering characteristic, the suspension characteristic (damper characteristic), and the like, that are included in the running characteristic and that define the running characteristic. In this case, the prohibiting determination threshold $\alpha$ is relatively reduced for the characteristic of which a variation is easily experienced by a passenger of the vehicle. By so doing, a variation in characteristic of which a variation is easily experienced while the acceleration is varying is further strictly limited. Furthermore, the above prohibiting determination threshold $\alpha$ may be a constant value or may be a variable that varies on the basis of another factor, such as a vehicle speed.

$$J=\{(dGx/dt)^2+(dGy/dt^2)\}^{1/2} \qquad (2)$$

When affirmative determination is made in step S4 because the jerk is larger than the above prohibiting determination threshold $\alpha$, a flag F is set (step S5). That is, the flag F is set at "1". Subsequently, it is determined whether the jerk is smaller than an allowable determination threshold $\beta$ (step S6). The allowable determination threshold $\beta$ is used to evaluate a jerk when the jerk is decreased. More specifically, the allowable determination threshold $\beta$ is used to determine whether the jerk is decreased to a degree to which a change of the running characteristic may be started. The allowable determination threshold $\beta$ is used to determine the degree of jerk to which the behavior of the vehicle caused by a change of the running characteristic may be presumably superimposed on a variation in acceleration or to determine the control timing for changing the running characteristic so that a change of the running characteristic ends in a state where there is substantially no variation in acceleration. The allowable determination threshold $\beta$ is predetermined by a running test, a simulation, or the like. Then, one allowable determination threshold $\beta$ may be set for the overall running characteristic. Different from this configuration, the allowable determination threshold $\beta$ may be set one by one for the driving force characteristic, the shift characteristic, the steering characteristic, the suspension characteristic (damper characteristic), and the like, that are included in the running characteristic and that define the running characteristic. In this case, the allowable determination threshold $\beta$ is reduced for the characteristic of which a variation is easily experienced by a passenger of the vehicle. By so doing, a variation in characteristic of which a variation is easily experienced while the acceleration is varying is further strictly limited. Furthermore, the above allowable determination threshold $\beta$ may be a constant value and may be, for example, a value close to zero. Instead, the allowable determination threshold $\beta$ may be a value corresponding to a value (for example, maximum value) in the case where the jerk exceeds the above described prohibiting determination threshold $\alpha$. Specifically, as the maximum value of the jerk increases, the allowable determination threshold $\beta$ may be increased.

At the time or immediately after when the flag F is set at "1", the jerk is increased, so the jerk does not fall below the allowable determination threshold $\beta$ and, therefore, negative determination is made in step S6. In this case, the routine shown in FIG. 1 once ends. That is; because the jerk exceeds the prohibiting determination threshold $\alpha$, even when a large acceleration is applied and, as a result, the condition for changing the running characteristic is satisfied, a change of the running characteristic (particularly, a shift characteristic, output characteristic, or the like, that causes a variation in driving force) is prohibited.

the other hand, when negative determination is made in step S4, that is, when the jerk is lower than or equal to the prohibiting determination threshold $\alpha$, it is determined whether the flag F is "1" (step S7). The jerk is lower than or equal to the prohibiting determination threshold $\alpha$ both in the case where the jerk does not exceed the prohibiting determination threshold α even when the jerk is increased and in the case where the jerk falls at or below the prohibiting determination threshold α after the jerk exceeds the prohibiting determination threshold α. In the former case, that is, when the jerk does not exceed the prohibiting determination threshold α, the flag F is not set at "1", so negative determination is made in step S7. In this case, the jerk has not exceeded the prohibiting determination threshold α immediately before. In this case, a correction amount of the running characteristic determined on the basis of the command sportiness index Iout is computed (step S8). Particularly, in the control system according to the embodiment of the invention, a correction amount for the driving force characteristic is computed. The driving force characteristic includes the characteristic of control associated with driving force, such as the output characteristic of a driving force source (specifically, the engine or the motor) against an accelerator operation amount and the speed ratio control characteristic of the transmission. FIG. 1 shows an example of obtaining a correction amount of a required maximum acceleration rate.

Figure 7:
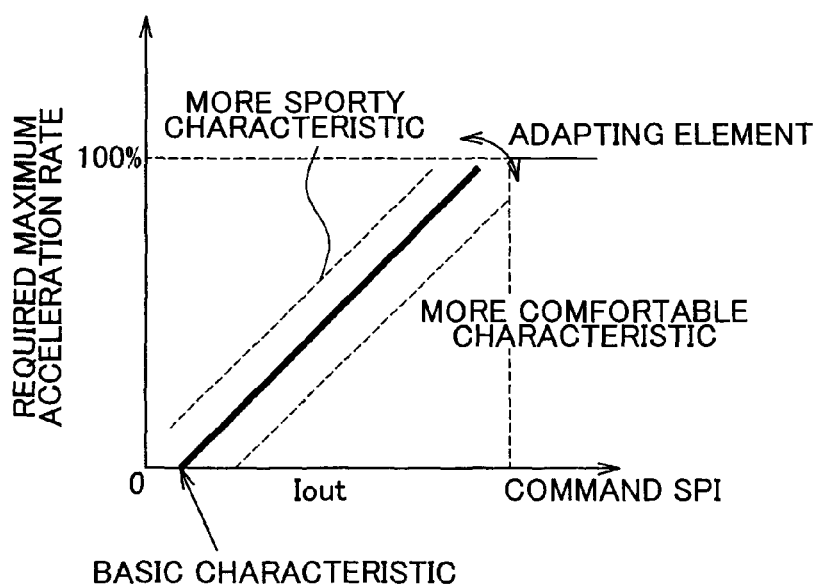
FIG. 7 is a map that shows the correlation between a command SPI and a required maximum acceleration rate.

Here, the required maximum acceleration rate defines a margin driving force. For example, the required maximum acceleration rate 100% indicates a state where the potential maximum acceleration of the vehicle can be achieved, and means to set the transmission 13 at a speed ratio at which the engine rotational speed is maximal or the highest speed ratio (speed ratio at the lowermost vehicle speed side). In addition, for example, the required maximum acceleration rate 50% indicates a state where a half of the potential maximum acceleration of the vehicle can be achieved, and means to set the transmission 13 at an intermediate speed ratio. In the example shown in FIG. 7, as the command sportiness index Iout increases, the required maximum acceleration rate increases. The basic characteristic indicated by the solid line in FIG. 7 is obtained by calculating the correlation between a command sportiness index Iout and a required maximum acceleration rate on the basis of data acquired when the vehicle is actually caused to run, and includes appropriate corrections through actual vehicle running or a simulation. When a characteristic line is set on a side at which the required maximum acceleration rate is larger than that of the basic characteristic, the acceleration of the vehicle is relatively large, so the characteristic is a so-called sporty running characteristic or sporty accelerating characteristic. In contrast, when the characteristic line is set on a side at which the required maximum acceleration rate is smaller than that of the basic characteristic, the acceleration of the vehicle is relatively small, so the characteristic is a so-called comfortable running characteristic or comfortable accelerating characteristic. These adjustments (that is, adaptation or tuning) may be appropriately performed in accordance with salability required of the vehicle. Note that the reason why, in the basic characteristic, the required maximum acceleration rate becomes zero when the command sportiness index Iout is larger than zero is because a slight speed running condition, such as running in a traffic jam and putting the vehicle into a garage, is not incorporated into control for setting or changing the accelerating characteristic.

Figure 8:
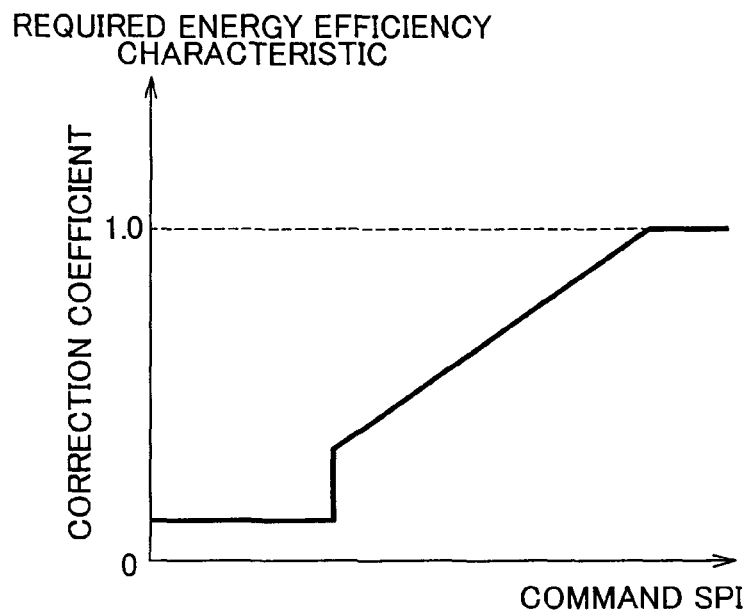
FIG. 8 is a graph that shows the correlation between a command SPI and a required energy efficiency characteristic.

The energy efficiency of the running characteristic based on the command sportiness index Iout is, for example, set on the basis of a command sportiness index Iout in itself, a required amount of generated electric power in a hybrid vehicle, the fuel efficiency of a power train from the driving force source to the driving wheels, information about a running road obtained through a navigation system (running environment information about the type of a road, such as a suburban road and an expressway) and running environment information, such as gradient information of an ascending/descending road. An example of correcting a required maximum acceleration rate on the basis of a command sportiness index Iout in itself will be described as an example. FIG. 8 schematically shows a required energy efficiency characteristic set on the basis of a command spottiness index (command SPI) Iout. The required energy efficiency characteristic (correction coefficient) is an index that indicates a degree to which the above described required maximum acceleration rate is incorporated into a required energy efficiency characteristic. In the example shown in FIG. 8, the required energy efficiency characteristic, is set to a characteristic that places importance on fuel efficiency when the command sportiness index Iout is small, and is set to a characteristic that places importance on running (sporty feel) when the command sportiness index Iout is large. That is, the correction coefficient is set to a constant value when the command sportiness index Iout is smaller than a predetermined value, and is increased with the command sportiness index Iout when the command sportiness index Iout is larger than or equal to the predetermined value.

A shift characteristic is computed on the basis of the thus obtained correction amount of the required maximum acceleration rate (step S9). Here, as the command sportiness index Iout reduces, the rotational speed is corrected to a rotational speed that places importance on fuel efficiency. By so doing, the rotational speed reduces, and the depression amount of the accelerator pedal increases, so a characteristic that has a margin for accelerator control may be obtained. As a result, the throttle opening degree is controlled at the open side, so fuel efficiency is improved. After step S9, the flag F is reset to zero (step S10), after which the routine once ends.

Figure 9:
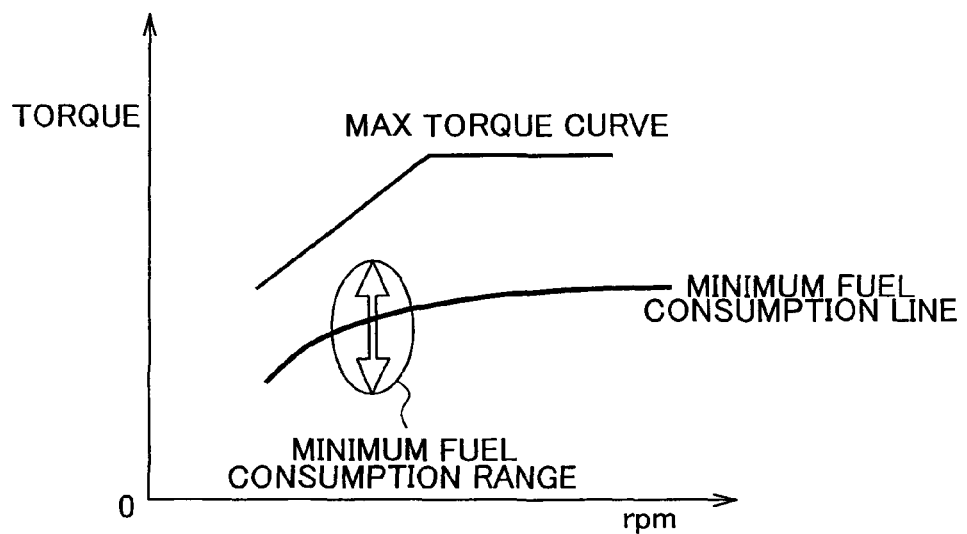
FIG. 9 is a graph that schematically shows a minimum fuel consumption region and a minimum fuel consumption line that passes through the region.

In control for correcting the required maximum acceleration rate on the basis of the command sportiness index Iout as described above, when the command sportiness index Iout is small because the detected or estimated resultant acceleration; that is, the instantaneous sportiness index Iin, is small, the required maximum acceleration rate obtained on the basis of the command sportiness index Iout is corrected to reduce on the basis of the required energy efficiency characteristic. As a result, the engine 8 is controlled so that the operating point of the engine 8 is placed on an optimal fuel consumption (fuel efficiency) line or a fuel consumption line close to the optimal fuel consumption line. A general (or basic) driving force characteristic of the vehicle is set so that the fuel consumption is minimum (i.e. fuel efficiency is highest) at least in a steady running state or a quasi-steady running state close to the steady running state. The operating point or operating range (minimum fuel consumption range, i.e. maximum fuel efficiency range) in which the fuel consumption is minimum may be expressed by an ellipse about a predetermined rotational speed and a predetermined torque where the abscissa axis indicates the rotational speed of the engine and the ordinate axis represents torque. Then, ranges of which the fuel efficiency sequentially deteriorates are expressed by so-called contour lines outside the ellipse. The optimal fuel consumption line is set so that the line passes through the range in which the fuel consumption is minimum and the operating point at which the frequency of use is high falls within that range. FIG. 9 is a graph that schematically shows the minimum fuel consumption range and the minimum fuel consumption line of each engine rotational speed. As described above, the details of control over the engine 8 and the transmission 13, that is, the running characteristic, are corrected.

On the other hand, when the command sportiness index Iout is large, the required energy efficiency characteristic increases toward a characteristic that places importance on running as shown in FIG. 8. In this case, the required maximum acceleration rate is incorporated into the driving force characteristic with a small degree of correction to reduce the required maximum acceleration rate or without any correction to reduce the required maximum acceleration rate. In this case, the fuel efficiency somewhat decreases; however, it is possible to achieve running with a large margin for accelerator control, which is suitable for a driver's driving orientation and a running environment.

An example of running over which the above control is executed will be described by way of an example during braking or when the vehicle runs on a winding road. When a deceleration resulting from braking operation, such as depressing a brake pedal, is large, the absolute value of the longitudinal acceleration increases, so the above described instantaneous sportiness index Iin increases. When the increased instantaneous sportiness index Iin is larger than the last instantaneous sportiness index Iin based on which the command sportiness index Iout held at that point in time is set the command sportiness index Iout increases. Then, because the required maximum acceleration rate based on the command sportiness index Iout is set, the shift characteristic is changed so that the low vehicle speed side speed ratio is frequently used. Therefore, because a relatively large speed ratio is set as a speed ratio during braking, the engine rotational speed becomes higher than the rotational speed based on the pre-changed running characteristic, and the kinetic energy of the vehicle is recovered as the rotational energy of a rotating member, such as the engine 8 and the transmission 13. When the accelerator pedal is depressed to accelerate again immediately after such deceleration, the rotational speed of the rotating member, such as the engine 8, has been already maintained at a high rotational speed, so the percentage at which the power output from the engine 8 is consumed by an increase in the rotational speed reduces. In this case, the percentage at which the power is consumed by acceleration of the vehicle increases, and, as a result, accelerator controllability improves, and the re-accelerating characteristic improves.

In contrast to this, when the vehicle decelerates gently, the instantaneous sportiness index Iin does not increase, so, when the already held command sportiness index Iout is small, the running characteristic of the vehicle is maintained at a characteristic that achieves mild running. Thus, a speed ratio against a depression amount of the accelerator pedal is smaller than that when the vehicle performs sporty running, and the engine rotational speed may be held at a relatively low rotational speed, so it is possible to achieve running with good fuel efficiency.

In addition, when the degree of acceleration/deceleration or steering angle is large when the vehicle runs on a winding road, the resultant acceleration, that is, the instantaneous sportiness index Iin, increases, and the running characteristic of the vehicle is controlled to a characteristic that easily achieves so-called sporty running accordingly. That is, the accelerating performance and the decelerating performance are relatively large, a so-called direct steering feel increases, and, furthermore, the suspension characteristic becomes a so-called hard characteristic. Thus, when the accelerator pedal is returned before a corner, a relatively high speed ratio is set, so the engine rotational speed increases to increase the effect of an engine brake, and the increased engine rotational speed is maintained thereafter. In addition, when the accelerator pedal is depressed at the time of leaving a corner, because the engine rotational speed is maintained at a relatively high rotational speed as described above, the percentage at which power output from the engine 8 is consumed by an increase in the rotational speed is small, the percentage at which the power is consumed by acceleration of the vehicle increases, and, as a result, the re-accelerating characteristic improves. In contrast to this, when the vehicle gently decelerates, enters a corner and passes the corner, the command sportiness index Iout becomes small and an operating point at which the fuel efficiency is good is selected as described above, so it is possible to achieve running suitable for a driving orientation with good fuel efficiency.

Note that correction of the characteristic in step S6 described above may be performed on the basis of another factor in addition to or instead of correction based on the command sportiness index Iout as described above. For example, in the hybrid vehicle that includes an electric motor having a power generating function as a driving force source in addition to the engine 8, power output from the engine 8 may be used to generate electric power or kinetic energy of the vehicle may be used to generate electric power, and the electric power may be stored in an electrical storage device, such as a battery. Such recovery and storage of energy are allowed on the precondition that electric power may be stored by the electrical storage device, and, when the amount of electric power stored in the electrical storage device is large, recovery and storage of energy are restricted. On the other hand, the amount of power generation increases because the rotational speed of the electric motor (generator) increases as the rotational speed of the engine 8 increases. Then, in step S6, when the amount of charge, that is, the so-called state of charge (SOC), of the electrical storage device, is already high and a required power generation amount is small, the running characteristic is corrected to a characteristic that gives good fuel efficiency as in the case where the above described command sportiness index Iout is small. For example, the required maximum acceleration rate based on the command sportiness index Iout is corrected to reduce to thereby change the running characteristic to a characteristic that performs running with suppressed engine rotational speed.

In addition, a factor of correcting the characteristic may be the fuel efficiency of the power train. The power train from the driving force source, such as the engine 8, to the driving wheels via the transmission 13 is formed of a plurality of rotating members, so there is an operating condition with a small loss, such as a small relative rotational speed, and, in addition, there is a shift condition where the fuel efficiency of the engine 8 is good. Such a good fuel consumption efficiency condition may be measured or acquired in advance on the basis of the configuration of the power train. The characteristic may be corrected in step S6 so as to set such a good, fuel efficiency condition.

The characteristic may be corrected on the basis of a running environment. The running environment is the condition of a running road and therearound, and is indicated by the type or environment of a road distinguished by a road surface condition, the length of a straight road, whether the number of traffic signals is large or small, atmospheric pressure, and the like. The running environment includes an urban road, a suburban road, an ordinary road, an expressway, a limited highway, a paved road, an unpaved road, a slushy road, a flat road, an ascending/descending road, a lowland road, a highland road, and the like. Information about these running environments may be acquired using the navigation system, and the gradient of an ascending/descending road may also be obtained on the basis of power output from the driving force source, an actual longitudinal acceleration, and the like. When these running environments require the vehicle, for a relatively small driving force, the characteristic is corrected to improve fuel efficiency. For example, the required maximum acceleration rate based on the command sportiness index Iout is corrected to reduce to thereby change the running characteristic to a characteristic that performs running with suppressed engine rotational speed.

Incidentally, in the above described control system, when no sporty running is particularly performed or sporty running is not particularly required, shift control is executed on the basis of the driving force characteristic or shift characteristic set as a characteristic that places importance on the fuel efficiency of the vehicle or on the basis of a characteristic corrected from the driving force characteristic or the shift characteristic, because of the small command sportiness index Iout. In contrast to this, when the command sportiness index Iout is large, a speed ratio based on the required maximum acceleration rate obtained from the command sportiness index Iout is set. In this way, there are a plurality of references or basic data that determine a speed ratio, so a final speed ratio is determined as described below.

Figure 10:
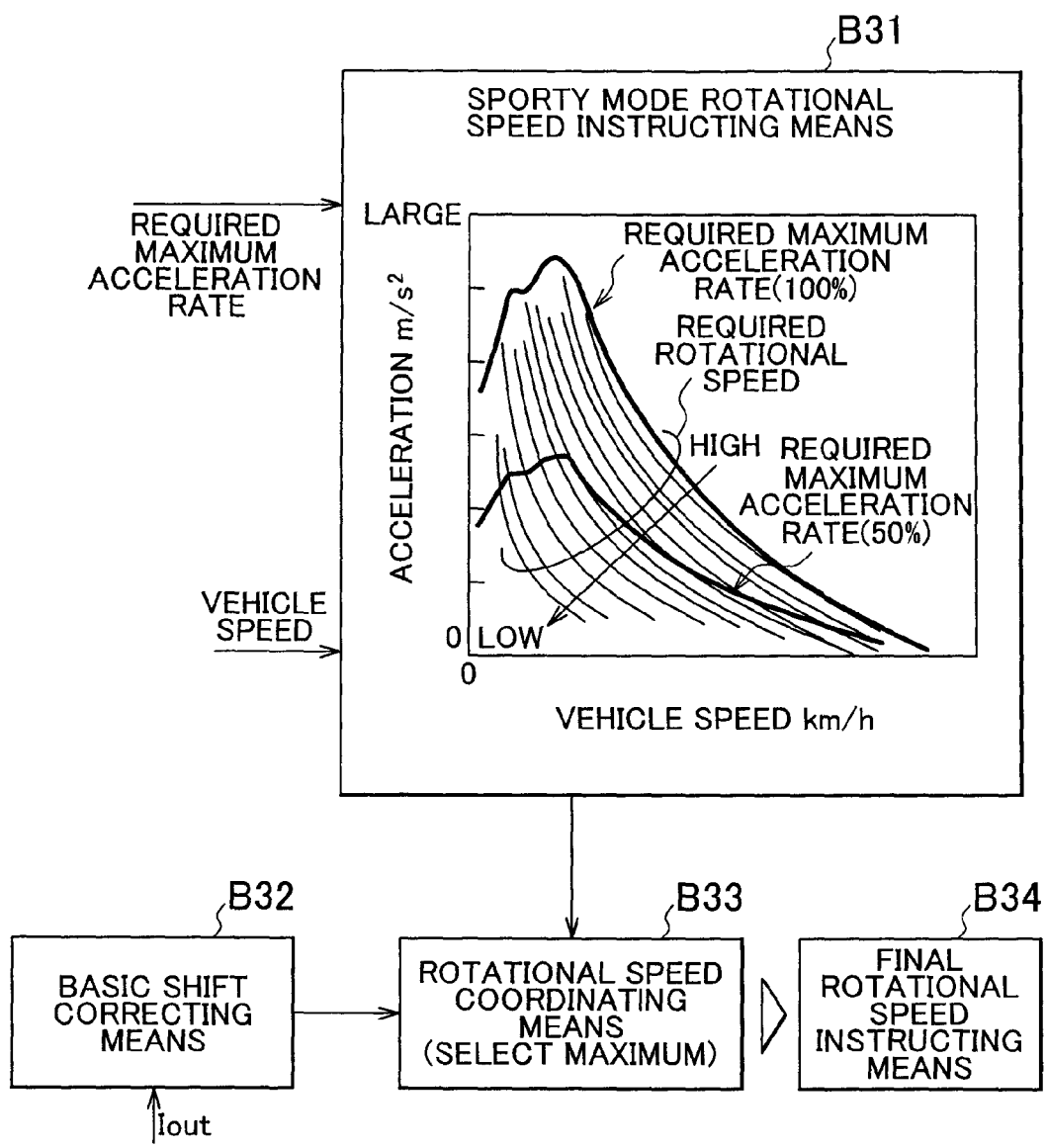
FIG. 10 is a block diagram for illustrating a shift control system that selects the maximum of a target rotational speed obtained by basic shift correcting means and a target rotational speed obtained by sporty mode rotational speed instructing means for a continuously variable transmission to set the selected one as a control command signal.

A vehicle equipped with a continuously variable transmission as the transmission 13 or a hybrid vehicle that is able to control the engine rotational speed by a motor calculates a target output power on the basis of a vehicle speed and a drive request amount and is then controlled so as to attain the engine rotational speed that achieves the target output power. FIG. 10 shows the correlation between a vehicle speed and an acceleration for each required rotational speed. Here, the required maximum acceleration obtained from the command sportiness index Iout on the basis of the above described FIG. 7 is added to the correlation in FIG. 10. For example, the required maximum accelerations of which the required maximum acceleration rates are 100% and 50% are indicated by the solid lines in FIG. 10. Thus, a rotational speed indicated by a line that passes through an intersection of a line indicating a required maximum acceleration obtained from the command sportiness index Iout and a line indicating a vehicle speed at a current point in time is a required rotational speed.

The vehicle equipped with the transmission 13 and described with reference to FIG. 2 includes a basic shift map in order to control a speed ratio that is set by the transmission 13. For a continuously variable transmission, the shift map sets a speed ratio on the basis of a vehicle speed and an engine rotational speed. An example of the speed ratio control is generally known as torque demand control. For example, a required driving force is obtained from a driving force map on the basis of a vehicle speed and an accelerator operation amount that is a drive request amount, and then an output power required of the engine is obtained from the required driving force and a vehicle speed or an engine rotational speed. A target engine rotational speed at which the required output power is output at an optimal fuel efficiency is obtained on the basis of an engine rotational speed map, and then the speed ratio of the continuously variable transmission is controlled so as to achieve the target engine rotational speed. That is, the transmission 13 is caused to function as a rotational speed control mechanism for the engine that serves as the driving force source. Note that the output power of the engine is obtained by the product of a torque and a rotational speed, so an engine torque that achieves the required output power is obtained on the basis of the target engine rotational speed or a vehicle speed corresponding to the target engine rotational speed, and a throttle opening degree is calculated so as to attain the engine torque.

Sporty mode rotational speed instructing means B31 shown in FIG. 10 is means for providing instructions on a required rotational speed obtained on the basis of the above described command sportiness index Iout. In addition, basic shift correcting means B32 is means for correcting the shift characteristic in normal engine rotational speed control that places importance on fuel efficiency, such as torque demand control, on the basis of the command sportiness index Iout, and providing instructions on a target rotational speed (target speed ratio). The so-called basic correction rotational speed is compared (coordinated) with the so-called sporty mode rotational speed by rotational speed coordinating means B33, and the higher rotational speed is selected (such selection is called maximum selection). The thus selected rotational speed is output by final rotational speed instructing means B34 as a control signal. Thus, when the basic correction rotational speed is higher than the sporty mode rotational speed in a state where the accelerator operation amount is large, the basic correction rotational speed is employed as a control amount and is output as a shift command signal. Then, as the running characteristic gradually varies to a sporty characteristic with an increase in the resultant acceleration (instantaneous sportiness index Iin), or the like, and the sporty mode rotational speed becomes higher than the basic correction rotational speed accordingly, the sporty mode rotational speed is employed as a control amount through maximum selection, and is output as a shift command signal.

Figure 11:
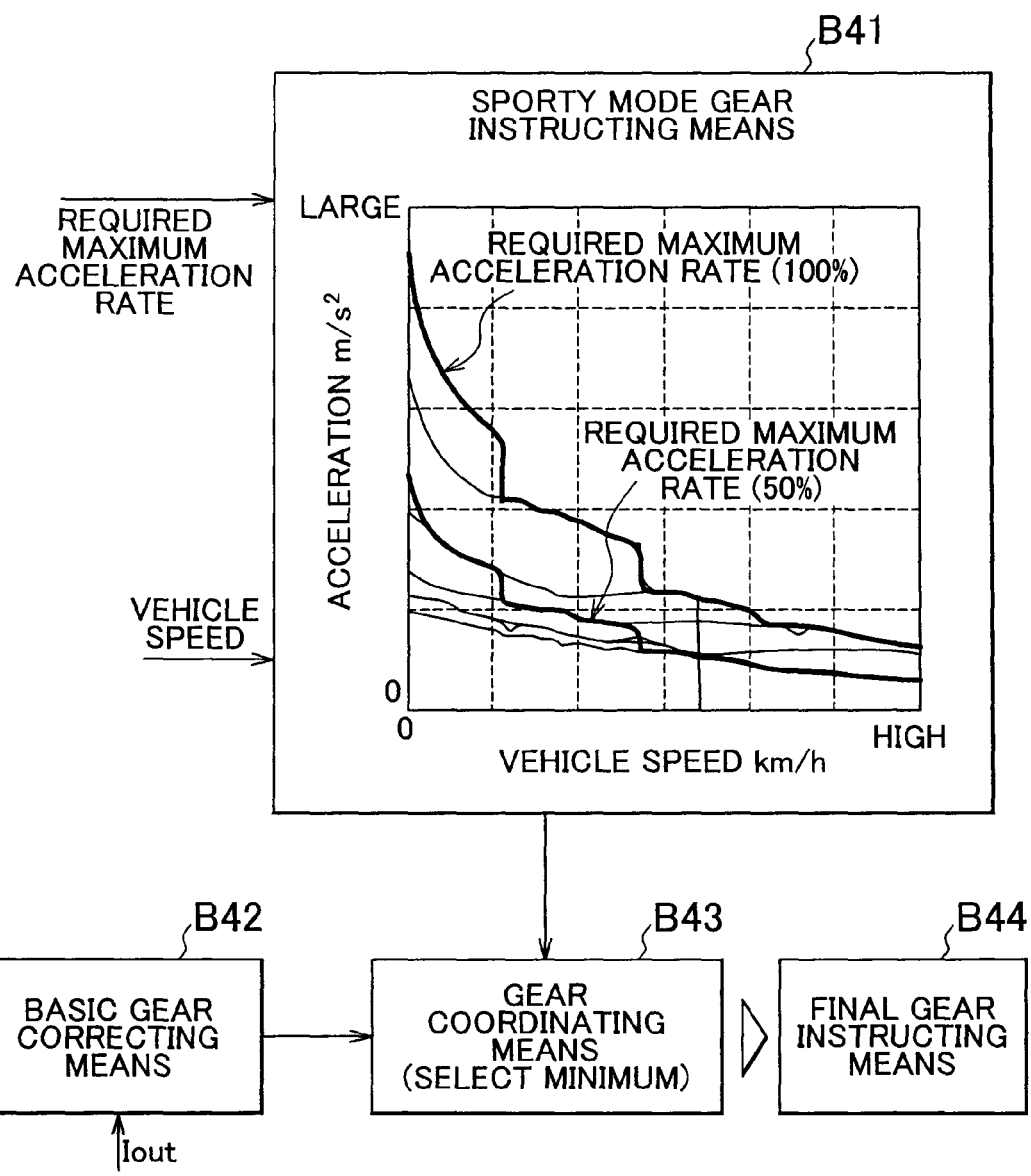
FIG. 11 is a block diagram for illustrating a shift control system that selects the minimum of a target gear obtained by basic gear correcting means and a target gear obtained by sporty mode gear instructing means for a step-gear transmission to set the selected one as a control command signal.

On the other hand, when the transmission 13 is a step-gear transmission, control is performed as shown in FIG. 11. In shift control over the step-gear transmission, a target gear is determined, and then a control command signal is output to an actuator of the transmission 13 so as to set the determined gear. Thus, the correlation at each gear between a vehicle speed and an acceleration is shown in FIG. 11. The lines of the required maximum accelerations 100% and 50% are added as the required maximum acceleration rates obtained from the command sportiness index Iout, and indicated by the wide solid lines in FIG. 11. Thus, a gear indicated by the line of a gear closest to an intersection between a line indicating the required maximum acceleration obtained from the command sportiness index Iout and a line indicating a vehicle speed at a current point in time is a target gear.

When control is executed by the control system according to the embodiment of the invention, the sporty target gear obtained from FIG. 11 is compared (coordinated) with a basic correction gear that is obtained by correcting a basic target gear (for example, a speed ratio determined on the basis of accelerator operation and a vehicle speed) based on a prepared shift line map on the basis of the command sportiness index Iout, and then a low vehicle speed side gear having a higher speed ratio is selected (such selection is called minimum selection). As a result, in a state where the sportiness index is small, running with good fuel efficiency is possible; whereas, in a state where sporty running is required, the speed ratio increases to increase maximum driving force or engine brake force, so the behavior control over the vehicle becomes quick.

As shown in FIG. 11, sporty mode gear instructing means B41 is means for providing instructions on a gear obtained on the basis of the above described command sportiness index Iout, and basic gear correcting means B42 is means for correcting a gear, obtained on the basis of a normal shift line map showing the correlation between an accelerator pedal operation amount and a vehicle speed, on the basis of a relatively smaller command sportiness index Iout. These so-called sporty mode gear and basic correction gear are compared (coordinated) with each other by gear coordinating means B43, and the lower speed side gear (gear having a higher speed ratio) is selected (minimum selection). The thus selected gear is output by final gear instructing means B44 as a control signal. That is, the transmission 13 is caused to function as a rotational speed control mechanism for the engine that serves as the driving force source. Thus, when the basic correction gear is a lower speed side gear than the sporty mode gear in a state where the accelerator operation amount is large, the basic correction gear is employed as a control amount and is output as a shift command signal. The gear is obtained on the basis of a shift line map that is set by placing importance on running, so sporty running is possible. Then, as the running characteristic gradually varies to a sporty characteristic with an increase in the resultant acceleration (instantaneous sportiness index Iin), and the like, and the sporty mode gear becomes a lower speed side gear than the basic correction gear accordingly, the sporty mode gear is employed as a control amount through minimum selection and is output as a shift command signal.

In this way, the running characteristic that places importance on fuel efficiency in a state where the command sportiness index Iout is relatively small and the running characteristic that easily allows sporty running, such as quick behavior, in a state where the command sportiness index Iout is relatively large both vary in accordance with a variation in index obtained from the running condition, such as the acceleration of the vehicle. Thus, a variation between fuel efficient running and sporty running is continuous, so running with no sense of strangeness is possible.

The control system according to the embodiment of the invention varies the driving force characteristic on the basis of the command sportiness index Iout as described above; in addition to this, the control system may further vary the behavior characteristic, such as the steering characteristic and the damper characteristic of the suspension mechanism, on the basis of the command sportiness index Iout to easily achieve running appropriate for a driver's driving orientation and a running environment. In this case, when the command sportiness index Iout is relatively small, the degree of incorporation of the command sportiness index Iout into the behavior characteristic may be corrected as in the case where the required maximum acceleration rate is corrected as described above. By so doing, the behavior characteristic is set so as to be adapted to the fact that the above described driving force characteristic is set to the fuel efficient characteristic, so the driving force characteristic and the so-called chassis characteristic are adapted to each other, and the fuel efficiency and the running characteristic may be further improved.

Figure 12:
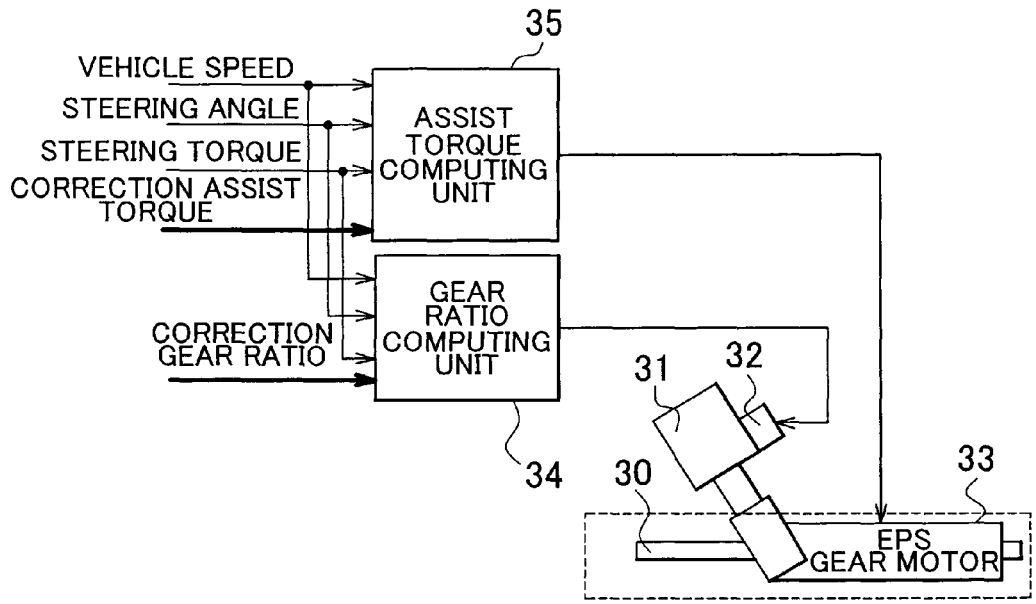
FIG. 12 is a block diagram of control that incorporates a correction gear ratio and a correction assist torque, which are obtained on the basis of a command SPI, into a steering characteristic.

An example of controlling the above described behavior characteristic on the basis of the command sportiness index Iout will be described. FIG. 12 is a block diagram for illustrating control for changing the steering characteristic on the basis of the above described command sportiness index Iout. FIG. 12 schematically shows an electric power steering (EPS) mechanism that uses a variable gear ratio steering gear (VGRS gear). The EPS mechanism is provided with a rack 30 that receives steering force to thereby move back and forth in the transverse direction (lateral direction) of the vehicle. The rack 30 is in mesh with the gear of a VGRS gear unit 31. A VGRS actuator 32 for changing the gear ratio is assembled to the VGRS gear unit 31. In addition, the EPS mechanism is provided with an EPS gear motor 33 to assist movement of the rack 30 in a steered direction. Furthermore, a gear ratio computing unit 34 and an assist torque computing unit 35 are provided. The gear ratio computing unit 34 outputs a command signal to the VGRS actuator 32 to change the gear ratio. The assist torque computing unit 35 computes a torque to be output from the EPS gear motor 33 (thrust force applied to the rack 30) and then outputs the torque as a command signal. These EPS mechanism and computing units may be the ones having generally known configurations.

The detected vehicle speed, the detected steering angle and the detected steering torque are input as data in the above computing units 34 and 35. These data may be acquired from sensors provided in correspondence with the vehicle speed, steering angle and steering torque. In addition to this, a correction gear ratio is input as data to the gear ratio computing unit 34. The correction gear ratio is used to correct a command signal to the VGRS actuator 32, and is configured to be set to a value corresponding to the command sportiness index Iout. Specifically, a map that defines a correction gear ratio in correspondence with a command sportiness index Iout may be prepared in advance and a correction gear ratio may be obtained from the map. The correlation between a command sportiness index Iout and a correction gear ratio may be appropriately defined where necessary.

On the other hand, a correction assist torque is input as data in the assist torque computing unit 35 in addition to the vehicle speed, steering angle and steering torque. The correction assist torque is used to correct a command signal to the EPS gear motor 33 and is configured to be set to a value corresponding to the command sportiness index Iout. Specifically, a map that defines a correction assist torque corresponding to a command sportiness index Iout may be prepared in advance, and an assist torque may be obtained from the map. The correlation between a command sportiness index Iout and a correction assist torque may be appropriately defined where necessary.

Thus, in the case of the configuration shown in FIG. 12, the gear ratio in the VGRS gear unit 31 is changed in accordance with the command sportiness index Iout obtained on the basis of accelerations occurring in the vehicle 1, and a torque that assists steering force is changed.

Figure 13:
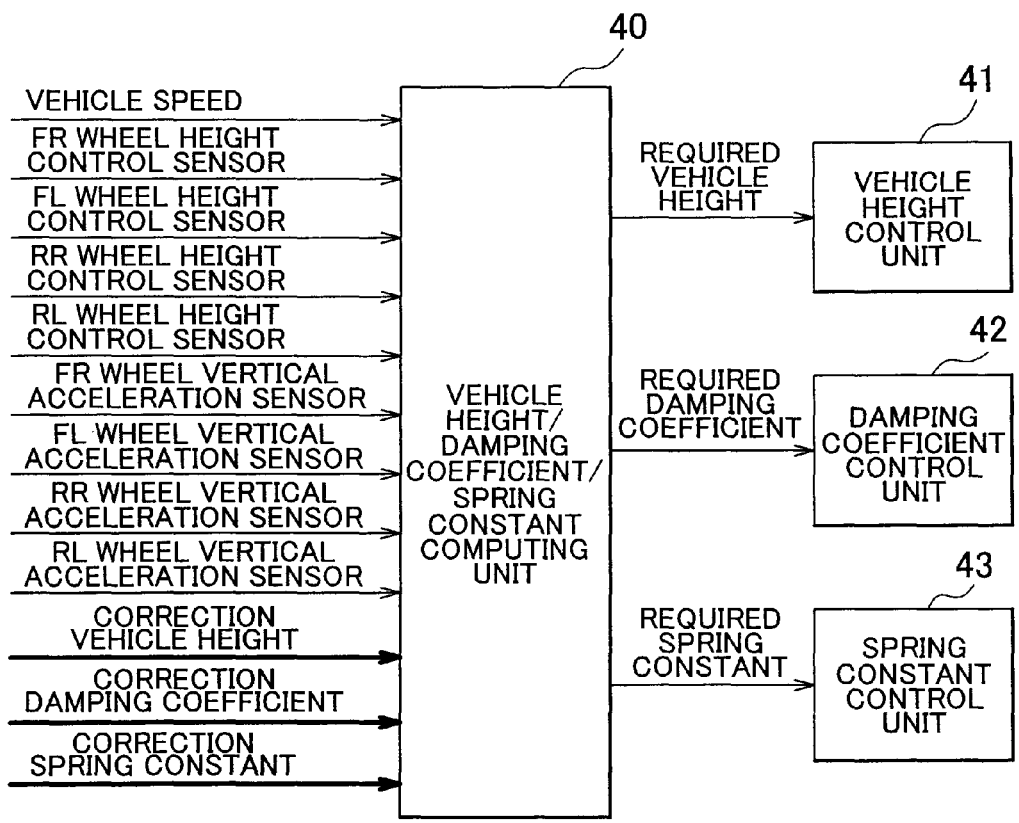
FIG. 13 is a block diagram of control that incorporates a correction vehicle height, a correction damping coefficient and a correction spring constant, which are obtained on the basis of a command SPI, into a suspension characteristic.

Furthermore, FIG. 13 is a block diagram for illustrating control for changing the suspension characteristic on the basis of the above described command sportiness index Iout, and shows an example that is configured to control the vehicle height, damping coefficient of vibrations and spring constant provided by a suspension mechanism (not shown). A computing unit 40 is provided to compute required values of these vehicle height, damping coefficient of vibrations and spring constant. The computing unit 40 is, for example, mainly formed of a microcomputer. The computing unit 40 is configured to compute using input data and prestored data to obtain a required vehicle height, a required damping coefficient and a required spring constant. For example, a vehicle speed, a signal detected by a front right (FR) wheel height control sensor, a signal detected by a front left (FL) wheel height control sensor, a signal detected by a rear right (RR) wheel height control sensor, a signal detected by a rear left (RL) wheel height control sensor, a signal detected by a front right (FR) wheel vertical acceleration sensor, a signal detected by a front left (FL) wheel vertical acceleration sensor, a signal detected by a rear right (RR) wheel vertical acceleration sensor, a signal detected by a rear left (RL) wheel vertical acceleration sensor, and the like, are the data. These detected signals are input to the computing unit 40 as data. These are similar to a generally known system.

Then, in the example shown in FIG. 13, a correction vehicle height, a correction damping coefficient and a correction spring constant are input as data for controlling the suspension characteristic. The correction vehicle height is data for correcting the vehicle height in accordance with the above described command sportiness index Iout. For example, a map that defines a correction vehicle height in correspondence with a command sportiness index Iout is prepared in advance, and then a correction vehicle height may be obtained from the map. In addition, the correction damping coefficient is data for correcting damping coefficients of devices that provide vibration damping function, such as the shock absorbers. For example, a map that defines a correction damping coefficient in correspondence with a command sportiness index Iout is prepared in advance, and a correction damping coefficient may be obtained from the map. The correction damping coefficient is increased as the command sportiness index Iout increases, and the suspension devices are set to have a so-called stiff characteristic. Similarly, the correction spring constant is data for correcting the spring constant in each suspension device. For example, a map that defines a correction spring constant in correspondence with a command sportiness index Iout is prepared in advance, and a correction spring constant may be obtained from the map. The correction spring constant is increased as the command sportiness index Iout increases, and the suspension devices are set to have a so-called stiff characteristic.

The computing unit 40 is configured to compute using the above described pieces of data, output the calculated required vehicle height to a vehicle height control unit 41 as a control command signal and then control the vehicle height so as to correspond to the command sportiness index Iout. Specifically, when the command sportiness index Iout is selectively large, the vehicle height is controlled to be relatively low. In addition, the computing unit 40 is configured to output the computed required damping coefficient to a damping coefficient control unit 42 as a control command signal and then control the damping coefficient so as to correspond to the command sportiness index Iout. Specifically, when the command sportiness index Iout is relatively large, the damping coefficient is controlled so as to be relatively large. Furthermore, the computing unit 40 is configured to output the computed required spring constant to a spring constant control unit 43 as a control command signal and then control the spring constant so as to correspond to the command sportiness index Iout. Specifically, when the command sportiness index Iout is relatively large, the spring constant is controlled so as to be relatively large.

As described above, the control system according to the embodiment of the invention is able to change the suspension characteristic, which is one example of the running characteristic, in accordance with a control index, such as a command sportiness index Iout obtained on the basis of an acceleration (particularly, a longitudinal acceleration Gx and a lateral acceleration Gy), and to set the suspension characteristic suitable for a driver's intention, a running environment and the running condition of the vehicle. As a result, in the case of so-called smooth running in which longitudinal and/or lateral accelerations are relatively small, the suspension characteristic becomes a so-called soft characteristic to improve a ride comfort. On the other hand, in the case where so-called quick running in which longitudinal and/or lateral accelerations are relatively large is required, the suspension characteristic becomes a so-called hard characteristic to suppress a squat or jump of the vehicle body in the longitudinal or lateral direction, rolling or pitching to thereby improve drivability.

Note that the acceleration may be calculated on the basis of the absolute value of a signal detected by the acceleration sensor or information about an operating system or vehicle movement or may be a combination of the absolute value of a signal detected by the accelerator sensor and information about an operating system or vehicle movement.

One aspect of the invention illustrated in the above described embodiment provides a vehicle control system. The vehicle control system includes: a third controller that obtains an index on the basis of a condition of a running vehicle and that changes control characteristics of first and second controllers that control a running condition of the vehicle on the basis of the index, wherein the first controller is configured to control power output from a driving force source of the vehicle to vary energy efficiency of the driving force source, the second controller is configured to vary a behavior characteristic of the vehicle, and the third controller is configured to set the control characteristic of the first controller so that the energy efficiency of the driving force source falls within a predetermined range and an output characteristic of the driving force source becomes a characteristic based on the index, and set the control characteristic of the second controller on the basis of the index so that the behavior characteristic of the vehicle becomes a characteristic based on the index.

In addition, in the above aspect, the index may be obtained on the basis of an acceleration of the vehicle, and the control characteristic of the first controller may be set to a characteristic that gives higher energy efficiency of the driving force source when the index is obtained on the basis of an acceleration smaller than a predetermined value than when the index is obtained on the basis of an acceleration larger than or equal to the predetermined value.

The invention claimed is:

1. A vehicle control system comprising:
a controller configured to obtain an index on the basis of a running condition of a vehicle and configured to vary a running characteristic of the vehicle on the basis of the index, wherein
the controller is configured to relatively delay a variation in the index in response to a variation in the running condition when the variation in the index decreases quickness of a behavior of the vehicle as compared with when the variation in the index increases the quickness of the behavior of the vehicle, and to correct the running characteristic on the basis of the index so that energy efficiency of a driving force source of the vehicle varies within a predetermined range depending on control over power output from the driving force source.

2. The vehicle control system according to claim 1, wherein
the running condition includes a resultant acceleration that includes a longitudinal acceleration component and lateral acceleration component of the vehicle,
the controller is configured to set the index so as to be larger as the resultant acceleration increases, and
the controller is configured to set the running characteristic such that energy efficiency of the driving force source is better when the index is obtained on the basis of a resultant acceleration smaller than a predetermined value than when the index is obtained on the basis of a resultant acceleration larger than or equal to the predetermined value.

3. The vehicle control system according to claim 1, wherein
the vehicle includes an internal combustion engine as the driving force source,
the controller is configured to control a rotational speed of the internal combustion engine, and
the energy efficiency of the driving force source is fuel efficiency of the of the internal combustion engine.

4. The vehicle control system according to claim 3, wherein
the vehicle further includes a transmission of which a speed ratio is varied to vary the rotational speed of the internal combustion engine, and the controller is configured to control the speed ratio of the transmission such that the rotational speed of the internal combustion engine becomes a rotational speed at which the fuel efficiency falls within the predetermined range.

5. The vehicle control system according to claim 3, wherein the vehicle further includes a power split mechanism that has a differential function for splitting power output from the internal combustion engine and a generator that is coupled to the power split mechanism and that is configured to vary a rotational speed of the internal combustion engine on the basis of an amount of electric power generated, and the controller is configured to control a rotational speed of the generator such that the rotational speed of the internal combustion engine becomes a rotational speed at which the fuel efficiency falls within the predetermined range.

6. The vehicle control system according to claim 5, wherein the vehicle further includes an electrical storage device that stores electric power generated by the generator, and the rotational speed at which the fuel efficiency falls within the predetermined range is lower when an amount of electric power stored in the electrical storage device is large than when the amount of electric power stored in the electrical storage device is small.

7. The vehicle control system according to claim 1, wherein the running condition includes at least one of a longitudinal acceleration and lateral acceleration of the vehicle.

8. The vehicle control system according to claim 1, wherein the controller is configured to acquire information about a running environment that is an environment outside the vehicle, including a road surface on which the vehicle runs, and to correct the running characteristic on the basis of the index and the information about the running environment.

* * * * *